United States Patent
Lee et al.

(10) Patent No.: US 9,781,224 B2
(45) Date of Patent: Oct. 3, 2017

(54) CONTENT TRANSMITTING SYSTEM, METHOD FOR OPTIMIZING NETWORK TRAFFIC IN THE SYSTEM, CENTRAL CONTROL DEVICE AND LOCAL CACHING DEVICE

(71) Applicants: SK TELECOM CO., LTD., Seoul (KR); KOREA ADVANCED INSTITUTE OF SCIENCE AND TECHNOLOGY, Daejeon (KR)

(72) Inventors: Jongmin Lee, Seongnam-si (KR); Kyungjun Lee, Seongnam-si (KR); Youngjae Shim, Seoul (KR); Shinae Woo, Daejeon (KR); Kyoungsoo Park, Daejeon (KR)

(73) Assignees: SK Telecom Co., Ltd., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 456 days.

(21) Appl. No.: 14/314,547

(22) Filed: Jun. 25, 2014

(65) Prior Publication Data
US 2014/0310374 A1   Oct. 16, 2014

Related U.S. Application Data

(63) Continuation of application No. PCT/KR2012/011479, filed on Dec. 26, 2012.

(30) Foreign Application Priority Data

Dec. 26, 2011   (KR) ........................ 10-2011-0142828

(51) Int. Cl.
*G06F 15/167*   (2006.01)
*H04L 29/08*   (2006.01)
(Continued)

(52) U.S. Cl.
CPC ........ *H04L 67/2842* (2013.01); *H04L 43/028* (2013.01); *H04L 43/04* (2013.01); *H04L 45/02* (2013.01)

(58) Field of Classification Search
CPC ............. G06F 11/1453; G06F 17/3015; G06F 17/30159; G06F 3/0608; G06F 3/0641; H04L 43/028; H04L 43/04
(Continued)

(56) References Cited

U.S. PATENT DOCUMENTS

2004/0110484 A1   6/2004   Koshino et al.
2007/0198523 A1*  8/2007   Hayim .............. H04L 29/06027
(Continued)

FOREIGN PATENT DOCUMENTS

JP    2010244571 A    10/2010
KR    1020100038800 A    4/2010
(Continued)

OTHER PUBLICATIONS

European Search Report for European Patent Application No. 12863260.1 dated Jul. 1, 2015.
(Continued)

*Primary Examiner* — Dustin Nguyen
*Assistant Examiner* — Hao Nguyen
(74) *Attorney, Agent, or Firm* — Hauptman Ham, LLP

(57) ABSTRACT

A content transmission system includes: a central control device to receive a content packet to be provided to a client device from a content server, store chunks divided from the received content packet together with corresponding chunk identifiers, check duplication of the divided chunks, and transmit the chunk identifier and flow information of a duplicate chunk to a local caching device instead of transmitting the content packet corresponding to the duplicate chunk; and the local caching device to: receive the chunk
(Continued)

identifier and the flow information of the duplicate chunk from the central control device, and transmit the content packet corresponding to the received chunk identifier and previously stored to the client device.

11 Claims, 17 Drawing Sheets

(51) Int. Cl.
*H04L 12/751* (2013.01)
*H04L 12/26* (2006.01)

(58) Field of Classification Search
USPC ........ 709/213, 223, 231, 247; 707/637, 674, 707/675, 681, 692, 697
See application file for complete search history.

(56) References Cited

U.S. PATENT DOCUMENTS

| | | |
|---|---|---|
| 2007/0230496 A1 | 10/2007 | Guo et al. |
| 2009/0113068 A1 | 4/2009 | Fujihira et al. |
| 2010/0094817 A1* | 4/2010 | Ben-Shaul ............ G06F 3/0608 707/697 |
| 2010/0325264 A1 | 12/2010 | Crowder et al. |
| 2011/0307447 A1* | 12/2011 | Sabaa ................. H04L 67/2842 707/637 |
| 2012/0158672 A1* | 6/2012 | Oltean ............. G06F 17/30091 707/692 |
| 2012/0158884 A1* | 6/2012 | Hatano ............ H04N 21/23106 709/213 |
| 2013/0318051 A1* | 11/2013 | Kumar .............. G06F 17/30156 707/692 |

FOREIGN PATENT DOCUMENTS

KR  1020100048315 A  5/2010
KR  1020100056934 A  5/2010

OTHER PUBLICATIONS

International Search Report dated Apr. 8, 2013 for PCT/KR2012/011479.

Japanese Office Action for application No. 2014-545836 dated Jun. 4, 2015.

* cited by examiner

CONTENT TRANSMITTING SYSTEM, METHOD FOR OPTIMIZING NETWORK TRAFFIC IN THE SYSTEM, CENTRAL CONTROL DEVICE AND LOCAL CACHING DEVICE

CROSS REFERENCE TO RELATED APPLICATIONS

The instant application is a continuation of PCT/KR2012/011479, filed Dec. 26, 2012, which is based on and claims priority of Korean Patent Application No. 10-2011-0142828, filed on Dec. 26, 2011, in the KIPO (Korean Intellectual Property Office). The disclosures of above-listed applications are hereby incorporated by reference herein in their entirety.

TECHNICAL FIELD

The present disclosure relates to a content transmission system for reducing duplicate transmissions of content therein, a method of optimizing network traffic in the system, a central control device, and a local caching device.

BACKGROUND

The statements in this section merely provide background information related to the present disclosure and do not constitute prior art.

As Internet content users and pieces of massive Internet content increase in number, quality of service (QoS), such as a reduction in download speed for web pages, videos, audio, images, and applications, is at issue.

Various content transmission service technologies are currently under development. These content transmission services enable transmission of large files, such as online motion pictures (video on demand (VoD) and live streaming), music streaming, file uploading, and file downloading, and the corresponding market is expanding accordingly.

With the rapid proliferation of smart phones, services for transmitting massive content, such as YouTube, Internet protocol television (IPTV), Apple App Store, and T-Store, have been recently developed, and the advent of these services is leading to a drastic increase in the traffic on communication networks.

These services are characterized by transmitting content, which is duplicated a different number of times according to popularities, to a user in the same domain or the same radio coverage, and their importance is gradually increasing. The inventor(s) has experienced that while the traffic on communication networks is drastically increasing due to transmission of massive content, duplicate transmissions of content further increase the traffic load on communication networks, resulting in the deterioration of communication service quality.

SUMMARY

One aspect of the present disclosure provides a content transmission system that includes a central control device and a local caching device. The central control device is configured to receive a content packet to be provided to a client device from a content server, and transmit the received content packet to a local caching device. The central control device is further configured to receive a chunk identifier and flow information of a duplicate chunk of the content packet from the local caching device, and register the chunk identifier and the flow information as duplication-removal targets. And The central control device is further configured to receive a next content packet from the content server, and transmit only the chunk identifier and the flow information of the next content packet to the local caching device. The local caching device is configured to receive the content packet from the central control device, store chunks divided from the received content packet together with corresponding chunk identifiers, check duplication of the divided chunks, and transmit the chunk identifier and the flow information of the duplicate chunk to the central control device. The local caching device is further configured to receive the chunk identifier and the flow information from the central control device, and transmit the content packet corresponding to the received chunk identifier to the client device.

Another aspect of the present disclosure provides a content transmission system that includes a central control device and a local caching device. The central control device is configured to receive a content packet to be provided to a client device from a content server, store chunks divided from the received content packet together with corresponding chunk identifiers, check duplication of the divided chunks, and transmit the chunk identifier and flow information of a duplicate chunk to a local caching device instead of transmitting the content packet corresponding to the duplicate chunk. The local caching device is configured to receive the chunk identifier and the flow information of the duplicate chunk from the central control device, and transmit the content packet corresponding to the received chunk identifier and previously stored to the client device.

Still another aspect of the present disclosure provides a central control device that includes a communicator, a controller, and a storage. The communicator is configured to perform communication with a content server and a local caching device. The controller is configured to receive a content packet to be provided to a client device from a content server through the communicator, and transmit the received content packet to a local caching device. The controller is further configured to receive a chunk identifier and flow information of a duplicate chunk of the content packet from the local caching device, and register the chunk identifier and the flow information as duplication-removal targets. The controller is further configured to receive a next content packet from the content server, and transmit only the chunk identifier and the flow information of the next content packet to the local caching device. The storage is configured to temporarily store chunks divided from the received content packet together with corresponding chunk identifiers, and store the received chunk identifier and the received flow information.

Yet another aspect of the present disclosure provides a local caching device that includes a communicator, a controller, and a storage. The communicator is configured to communicate with a client device and a central control device connected to a content server. The controller is configured to receive a content packet from the central control device through the communicator, store chunks divided from the received content packet together with corresponding chunk identifiers, and provide the received content packet to the client device; and receive the chunk identifier and the flow information of a duplicate chunk from the central control device, to control transmission of the previously stored content packet corresponding to the received chunk identifier to the client device. The storage is configured to store the divided chunks together with the corresponding chunk identifiers.

Further another aspect of the present disclosure provides a method of optimizing network traffic in a content transmission system including a central control device connected to a content server providing content packets and a local caching device connected to a client device to which the content packets are provided. The method includes transmitting, at the central control device, content packets received from the content server to the local caching device; checking, at the local caching device, chunk duplication of the received content packets and providing the received content packets to the client device; when said checking at the local caching device finds a duplicate chunk of the received content packets, transmitting, at the local caching device, a chunk identifier and the flow information of the duplicate chunk to the central control device; registering, at the central control device registers the received chunk identifier and the received flow information of the duplicate chunk as duplication-removal targets; transmitting, at the central control device, only a chunk identifier and the flow information of a next content packet for a flow registered as a duplication-removal target to the local caching device; and when the local caching device receives the chunk identifier and the flow information of the duplicate chunk from the central control device, transmitting, at the local caching device, a previously the stored content packets corresponding to the received chunk identifier to the client device.

Further another aspect of the present disclosure provides a method of optimizing network traffic in a content transmission system including a central control device connected to a content server providing content packets and a local caching device connected to a client device to which the content packets are provided. This method includes, when the central control device receives content packets from the content server, performing a chunk duplication check on the content packets; transmitting, at the central control device, a chunk identifier and the flow information of a duplicate chunk for the content packets subjected to the chunk duplication check to the local caching device; and when the local caching device receives the chunk identifier and the flow information of the duplicate chunk, transmitting a previously stored content packet corresponding to the received chunk identifier to the client device.

The present disclosure can provide a content transmission system that includes a central control device connected to a content server to monitor and control duplicate transmissions of content on a content transmission network and a local caching device connected to a client and transmitting content, and thus can be simply and transparently applied to an existing system and protocol, that is, practical and operationally feasible.

In addition, in the present disclosure, a central control device checks whether or not content packets provided by the content server to a client are cached by exchanging only identification information with a local caching device, and causes content to be transmitted from the local caching device when the local caching device has cached the content, thereby reducing the load of network traffic transmitted in a duplicate manner between the Internet and a concentrator station. For this reason, it is possible to ensure convenience in network management and to decrease costs.

Furthermore, the present disclosure enables a local caching device prepared in proximity to a client to check whether or not content requested by a client has been cached and to directly transmit the cached content to the client, thereby reducing duplicate transmissions of the content. Therefore, it is possible to improve quality perceived by the client.

DETAILED DESCRIPTION

Hereinafter, exemplary embodiments of the present disclosure will be described in detail with reference to the accompanying drawings. In the following description and the accompanying drawings, when detailed descriptions on the known art related to the present disclosure are determined to unnecessarily obscure the gist of the present disclosure, the detailed descriptions will be omitted. Throughout the drawings, like elements are referred to by like numerals within the limits of the possible.

Various embodiments of the present disclosure provide a content transmission system that includes a central control device connected to a content server to monitor and control duplicate transmissions of content on a content transmission network and a local caching device connected to a client and transmitting content, and thus can be simply and transparently applied to an existing system and protocol, that is, practical and operationally feasible. In addition, in various embodiments of the present disclosure, a central control device checks whether or not content packets provided by the content server to a client are cached by exchanging only identification information with a local caching device, and causes content to be transmitted from the local caching device when the local caching device has cached the content, thereby reducing the load of network traffic transmitted in a duplicate manner between the Internet and a concentrator station. For this reason, it is possible to ensure convenience in network management and to decrease costs. Furthermore, various embodiments of the present disclosure enable a local caching device prepared in proximity to a client to check whether or not content requested by a client has been cached and to directly transmit the cached content to the client, thereby reducing duplicate transmissions of the content. Therefore, it is possible to improve quality perceived by the client.

Exemplary embodiments of the present disclosure provide a content transmission system for reducing the traffic on a network by minimizing duplicate transmissions of content during transmission of various types of content. Exemplary embodiments of the present disclosure also provide a central control device that is connected to a content server on a network and controls duplicate transmissions of content packets in order to minimize duplicate transmissions of provided content packets, and a local caching device for transmitting the corresponding content packets to a client. Exemplary embodiments of the present disclosure provide a network traffic optimizing method for reducing traffic on a network by minimizing duplicate transmissions of provided content packets in a content transmission system.

Detailed descriptions will be made regarding a content transmission system for monitoring duplicate content transmissions, and a central control device and a local caching device of the content transmission system with reference to the accompanying drawings.

Figure 1:
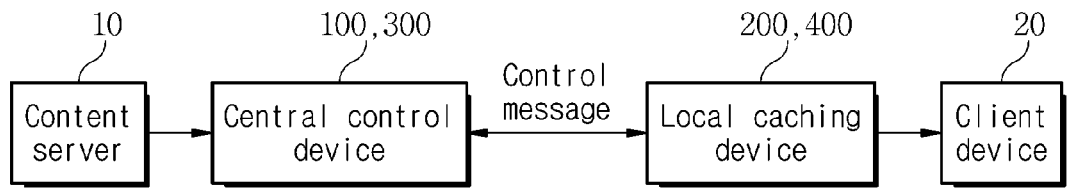
FIG. 1 is a block diagram of a configuration of a content transmission system according to at least one embodiment of the present disclosure.

FIG. 1 is a block diagram of a configuration of a content transmission system according to at least one embodiment of the present disclosure.

Referring to FIG. 1, a content transmission system includes a central control device (central node (CN)) 100 positioned at an entrance on a network at which content is input from at least one content server 10, and a local caching device (remote node (RN)) 200 positioned on the side of a client device 20 in the network to store content in a distributed fashion.

A central control device 100 or 300 transmits content packets received from the at least one content server 10 to a local caching device 200 or 400, identifying received content in flow units to check whether identified flows are duplication-target flows. The central control device 100 does not transmit content corresponding to a flow checked as a duplicate to the local caching device 200 or 400. Here, the content received from the content server 10 is divided into one or more flows (which are identified with pairs of a content server providing the content and a client receiving the content, e.g., transmission control protocol (TCP) flows) and transmitted, and each flow transmits the corresponding content through one or more Internet protocol (IP) packets using a protocol such as IP. Also, content transmitted between the content server 10, the central control device 100 or 300, the local caching device 200 or 400, and the client device 20 has the content server 10 as a source address and the client device 20 as a destination address, and thus is transmitted as IP packets transmitted from the content server 10 to the client device 20. The central control devices 100 and 300 and the local caching devices 200 and 400 receive the content in various ways and perform a process described below.

The local caching devices 200 and 400 divide content transmitted through the corresponding flow into chunks of a uniform size or in meaningful units, cache and store each chunk of the content, identify a flow for transmitting the content cached therein by monitoring the corresponding flow, and transmit content packets of the corresponding flow to the client device 20 instead of the content server 10.

In the content transmission system according to the present disclosure, duplication of content is monitored by any one of the central control device 100 and the local caching device 200. All or some components of the content transmission system, such as the content server 10, the central control device 100 or 300, the local caching devices 200 and 400, and the client device 20 are implemented by one or more processors and/or application-specific integrated circuits (ASICs).

A case where content duplication is monitored by the local caching device 200 in the content transmission system will be described in further detail below.

Figure 2:
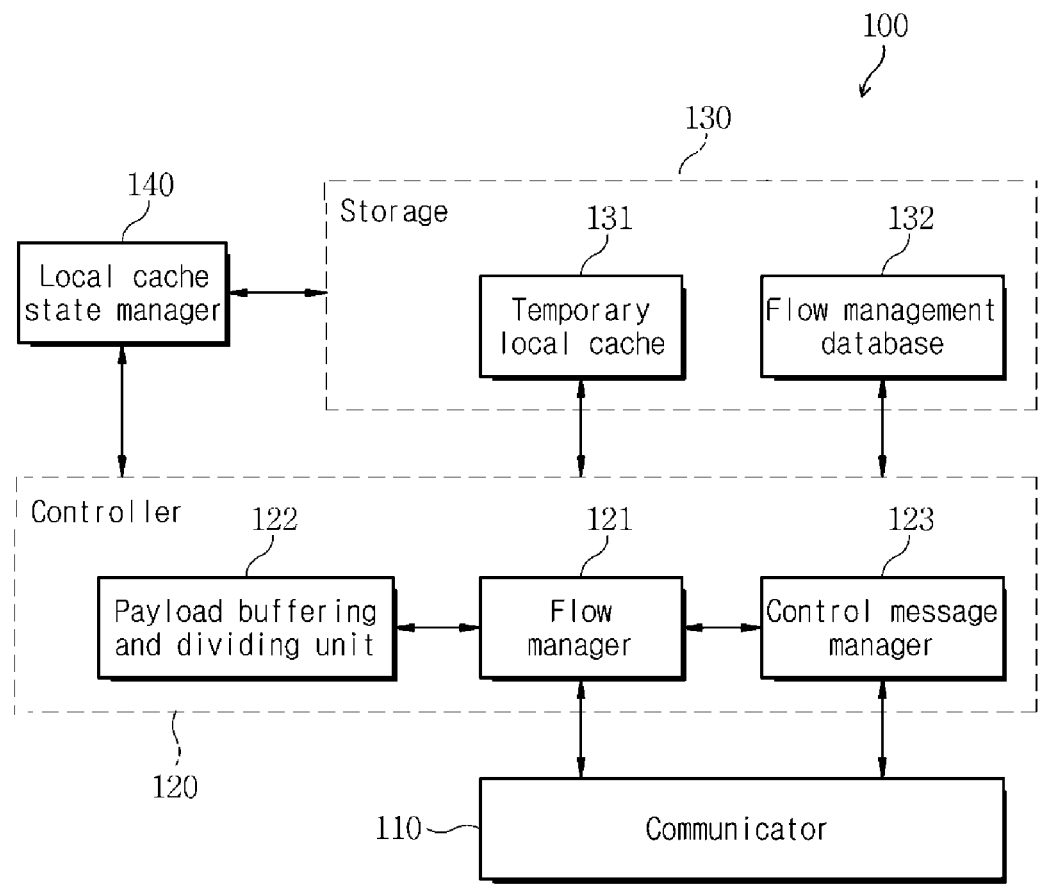
FIG. 2 is a block diagram of a configuration of a central control device in a content transmission system according to at least one embodiment of the present disclosure.

FIG. 2 is a block diagram of a configuration of a central control device in a content transmission system according to at least one embodiment of the present disclosure.

Referring to FIG. 2, the central control device 100 includes a communicator 110, a controller 120, a storage (or a memory device) 130 including a temporary local cache 131 and a flow management database 132, and a local cache state manager 140. All or some components of the central control device 100, such as the communicator 110, the controller 120, and the local cache state manager 140 are implemented by one or more processors and/or application-specific integrated circuits (ASICs).

The communicator 110 receives content packets provided by the at least one content server 10, transmits the content packets to the local caching device 200, and exchanges messages resulting from a process for monitoring content duplication. Here, the messages for duplication monitoring exchanged with the local caching device 200 include a control message including identification information, control information, etc. a content packet transmission message for transmitting the content packets, a response message, and so on. In addition, the communicator 110 exchanges data using one or more communication methods, and to this end, includes a plurality of communication modules that exchange data according to different communication methods, respectively.

The controller 120 includes a flow manager 121, a payload buffering and dividing unit 122, and a control message manager 123.

The controller 120 transmits the content packets received from the content server 10 via the communicator 110 to the local caching device 200. When flow information on a duplication check is received from the local caching device 200, the controller 120 identifies the received content packets in flow units, and checks whether the identified content packets are a duplication-removal target flow. When the content packets are identified as a duplication-removal target flow, the controller 120 buffers the identified content packets of the flow, divides the buffered content packets into chunks and stores the divided chunks in the storage 130. When the content packets are not identified as a duplication-removal target flow, the controller 120 transmits the received content packets to the local caching device 200. In other words, when continuously received content packets are not content cached in the local caching device 200, the currently received content packet are transmitted to the local caching device 200, such that content caching and/or a content duplication check are performed by the local caching device 200.

The flow manager 121 identifies the content packets received from the communicator 110 in flow units, and registers a flow, in which the same content packets cached in the flow management database 132 are transmitted, as a duplication-removal target flow using a duplicate chunk identifier and flow information (including flow context) of a content packet received from the local caching device 200. Here, the flow context includes, for example, a source IP, a destination IP, a source port, a destination port, a protocol, a payload length, a sequence number, a content type, etc. as flow identification information.

When the identified flow for the content packets received from the content server 100 is not a duplication-removal target flow, the flow manager 121 delivers the received content packets to the communicator 110 so as to transmit the content packets to the local caching device 200. On the other hand, when the identified flow is a duplication-removal target flow, the flow manager 121 delivers the identified flow to the payload buffering and dividing unit 122. Here, by checking whether information on the identified flow is stored in the flow management database 132, the flow manager 121 checks whether the identified flow is a duplication-removal target flow.

In addition, the flow manager 121 receives chunk identifiers of divided chunks of the content packets from the payload buffering and dividing unit 122 and delivers the received chunk identifiers to the control message manager 123.

The payload buffering and dividing unit 122 buffers payloads of the duplication-removal target flow delivered from the flow manager 121, divides the content packets contained in the buffered payloads into the plurality of chunks, and temporarily stores the divided chunks in the temporary local cache 131 of the storage 130 such that content packets transmitted from the local caching device 200 to the client 20 coincide with content packets transmitted from the content server 10. Such a method of dividing payloads into chunks will be described in detail later.

The control message manager 123 manages information necessary to monitor duplication of content packets, manages control messages exchanged with the local caching device 200, and checks coincidence of content packets while receiving chunk identifiers (signature values) of cached content packets from the local caching device 200. Specifically, the control message manager 123 includes the chunk identifiers of the content packets received from the flow manager 121 in a control message, transmits the control message to the local caching device 200 via the communicator 110, and receives and manages result information indicating that there is no chunk identifier and a content request message for requesting the corresponding content from the local caching device 200 when the corresponding chunk identifiers are not present in the check information on the chunk identifiers of the content packets received from the local caching device 200 via the communicator 110, that is, in the local caching device 200. At this time, the control message manager 123 delivers the result information included in the received content request message to the flow manager 121, thereby causing the flow manager 121 to transmit the corresponding content packets to the local caching device 200. After transmission of the control message, the control message manager 123 instructs the flow manager 121 to transmit no duplicate content packet, and considers that the local caching device 200 has transmitted content packets for chunk identifiers stored therein to the client device 20 when no content request message is received from the local caching device 200 for a previously set time. Here, the content packets transmitted from the local caching device 200 to the client device 20 are the packets checked as duplicates by the flow manager 121.

The storage 130 temporarily stores the chunks of the divided content packets in the temporary local cache 131 together with the corresponding identifiers of the chunks in the form of a database in which characteristics of the system (memory capacity, server speed, the total number of chunks to be stored, etc.) are taken into consideration. Also, the storage 130 stores flow information on the content packets transmitted from the content server 10 and registration information and management information on duplication-removal target flows. Here, when a response message transmitted after the local caching device 200 transmits content packets corresponding to the stored chunks is received, the temporary local cache 131 removes the temporarily stored chunks. Alternatively, the temporary local cache 131 removes the temporarily stored chunks according to a method set by a user.

The local cache state manager 140 monitors a state of the temporary local cache 131 of the storage 130, controls maintenance according to monitoring results, and checks whether the corresponding content chunk is stored in the temporary local cache 131 on a request from the flow manager 121.

Next, a configuration and operation of the local caching device 200 in the content transmission system according to at least one embodiment of the present disclosure will be described in detail with reference to the accompanying drawings.

Figure 3:
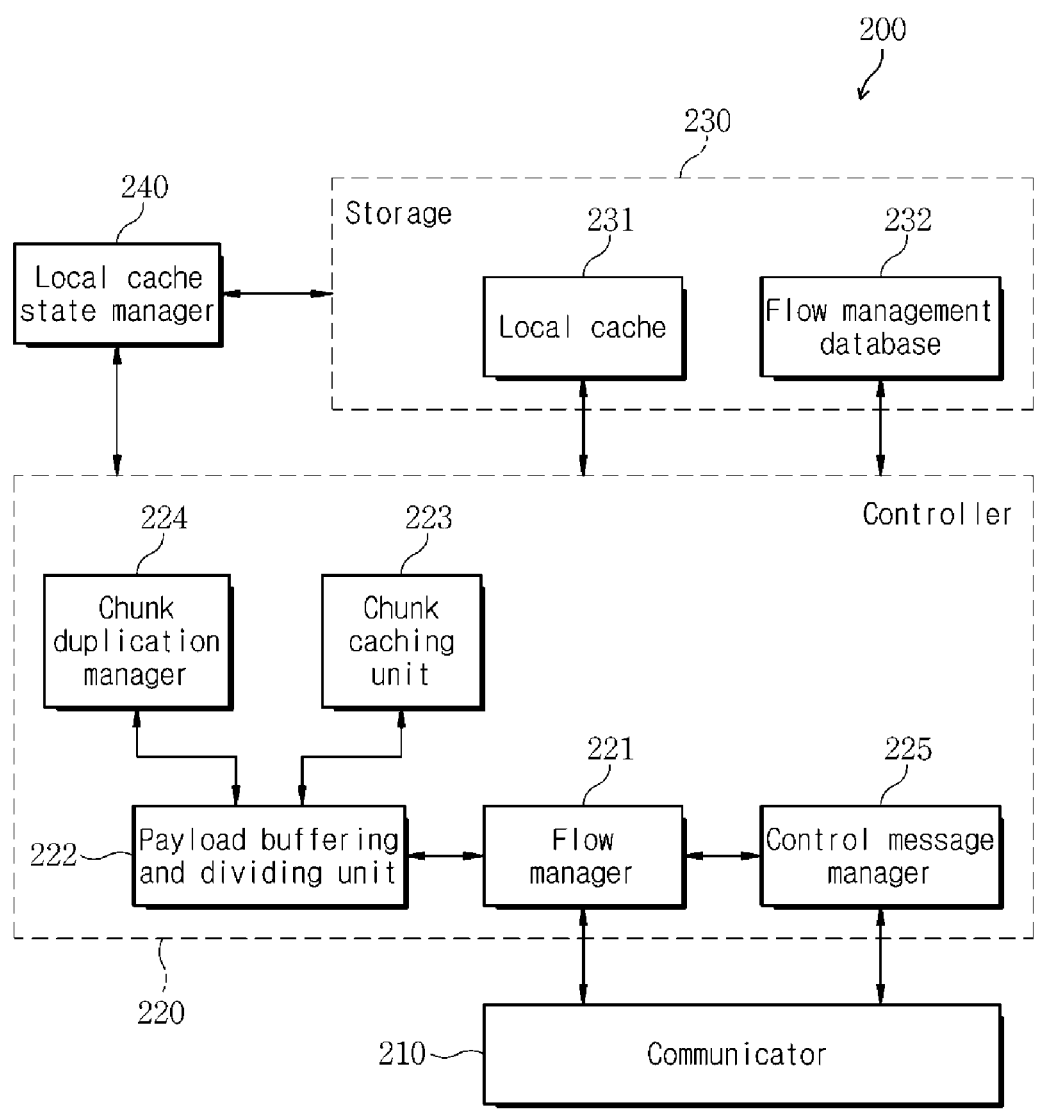
FIG. 3 is a block diagram of a configuration of a local caching device in a content transmission system according to at least one embodiment of the present disclosure.

FIG. 3 is a block diagram of a configuration of a local caching device in a content transmission system according to at least one embodiment of the present disclosure.

Referring to FIG. 3, the local caching device 200 includes a communicator 210, a controller 220, a storage 230 including a local cache 231 and a flow management database 232, and a local cache state manager 240. All or some components of the local caching device 200, such as the communicator 210, the controller 220, and the local cache state manager 240 are implemented by one or more processors and/or application-specific integrated circuits (ASICs).

The communicator 210 receives content packets transmitted by the central control device 100, transmits the content packets to the client device 20, and exchanges control messages resulting from a duplication removal process for monitoring content duplication with the central control device 100. Here, the exchanged messages for monitoring duplication include a control message which includes identification information, control information, etc., a content packet transmission message for transmission of the content packets, a response message, and so on. In addition, the communicator 210 exchanges data using one or more communication methods, and to this end, includes a plurality of communication modules that exchange data according to different communication methods.

The controller 220 includes a flow manager 221, a payload buffering and dividing unit 222, a chunk caching unit 223, a chunk duplication manager 224, and a control message manager 225. The controller 220 checks whether or not content packets received from the central control device 100 via the communicator 210 are duplicates while in the process of transmitting the content packets to the client device 20. When some of the content packets (e.g., a fifth packet) are received for duplication check, the controller 220 compares the received content packets with stored content packets, thereby checking whether or not the content packets are duplicates. Meanwhile, when the local caching device 200 receives content packets that are transmitted from the content server 10 to the client device 20 through the central control device 100, the local caching device 200 directly receives the content packets from the central control device 100, or receives the content packets transmitted to the client device 20, that is, the destination, via a mirroring scheme. Here, whether or not the content packets are duplicates is checked in flow units and chunk units. In other words, after buffering payloads of the content packets and dividing the buffered payloads into chunk units, the controller 220 checks whether or not the divided chunks are duplicates (whether or not the same chunks are present in stored chunks), and stores non-duplicate chunks in the local cache 231. Also, when chunk identifiers are received from the central control device 100, the controller 220 provides the corresponding chunks of a content packet stored in the local cache 231 to the client device 20. Here, the transmitted chunks constitute packets to be transmitted from the content server 10 to the client device 20 and are transmitted.

The flow manager 221 identifies the content packets received from the central control device 100 via the communicator 210 in flow units, and stores information on the identified flows in the flow management database 232.

In addition, the flow manager 221 performs a chunk duplication check on the content packets received from the central control device 100 via the communicator 210. Specifically, the flow manager 221 checks whether an identified flow for a content packet is a duplication-removal target flow. When the identified flow for the content packet is not a duplication-removal target flow, the flow manager 221 stores chunks obtained by dividing the buffered payload of the flow for the received content packet in the local cache 231, and performs a duplication check for the next transmitted content packet. When the identified flow is a duplication-removal target flow, the flow manager 221 delivers the identified flow to the payload buffering and dividing unit 222, and performs a duplication removal process. Here, in consideration of a specific transmission protocol (TCP, etc.), an application protocol type (file transfer protocol (FTP), peer-to-peer (P2P), hypertext transfer protocol (HTTP), etc.) transmitted through the corresponding protocol, and the type of transmission data (media content of an image/motion picture/etc., a document file, a binary file, an update file, etc.), the flow manager 221 determines whether or not chunks are duplicates. When a chunk of the corresponding flow has already been stored in the local cache 231, the flow manager 221 assumes that chunks of other content transmitted through the corresponding flow have been stored in the local cache 231, and delivers chunk identifiers and flow information (context of the flow) of the duplicate content to the control message manager 225 such that the chunk identifiers and the flow information are transmitted to the central control device 100.

Furthermore, the flow manager 221 delivers chunk identifiers received in the local cache 231 from the central control device 100 through the control message manager 225, to the chunk duplication manager 224, receives a result of checking a coincidence of chunk identifiers from the chunk duplication manager 224 to generate result information to be transmitted to the central control device 100, and delivers the generated result information to the control message manager 225. When the coincidence check result indicates that chunk identifiers coincide with each other, the flow manager 221 does not transmit the result information to the central control device 100 but delivers content packets stored in the local cache 231 and corresponding to the chunk identifiers to the communicator 210 so as to transmit the content packets to the client device 20. On the other hand, when chunk identifiers do not coincide with each other, the flow manager 221 delivers result information indicating that there is no stored coincident chunk identifier to the control message manager 225, and causes the control message manager 225 to request content packets for the chunk identifiers received from the central control device 100.

The payload buffering and dividing unit 222 buffers payloads of the flow for the content packets delivered from the flow manager 221, divides the buffered payloads into chunks, and delivers the divided chunks to the chunk caching unit 223. Such a method of dividing payloads into chunks will be described in detail later.

The chunk caching unit 223 stores the divided chunks in the local cache 231 of the storage 230 in order to cause the content packets transmitted to the client device 20 to coincide with content transmitted by the content server 10.

The chunk duplication manager 224 manages whether chunks divided by the chunk caching unit 223 are stored in the local cache 231. Specifically, the chunk duplication manager 224 checks whether each of the divided chunks has been stored in the local cache 231, and when there is a stored duplicate chunk, transmits information on the duplicate chunk to the flow manager 221. In addition, the chunk duplication manager 224 checks whether the chunk identifier received from the central control device 100 is stored in the local cache 231, and transmits the check result indicating whether a coincident chunk identifier is stored to the flow manager 221.

The control message manager 225 manages information necessary to monitor duplication of content packets, and manages control messages exchanged with the central control device 100. Specifically, the control message manager 225 includes the chunk identifiers and the flow information (flow context) received from the flow manager 221 in the control message, and transmits the control message to the central control device 100 via the communicator 210. Also, the control message manager 225 receives a control message including a chunk identifier and flow information (flow context) of a duplicate content packet from the central control device 100 via the communicator 210, and delivers the chunk identifier and the flow information included in the control message to the flow manager 221. The control message manager 225 transmits a content request message including chunk identifier check result information, that is, information indicating that no coincident chunk identifier is stored in the local cache 231, and information for a content request to the central control device 100 via the communicator 210.

The storage 230 stores the divided chunks of the content in the local cache 231 together with the corresponding identifiers of the chunks in the form of a database in which characteristics of the system (memory capacity, server speed, the total number of chunks to be stored, etc.) are taken into consideration. Also, the storage 230 stores flow information on the content packets transmitted to the client device 20 and registration information and management information on duplication-removal target flows.

Finally, the local cache state manager 240 monitors a state of the local cache 231 of the storage 230, and controls maintenance according to monitoring results.

The storage 130 of the central control device 100 and the storage 230 of the local caching device 200 described above store chunks in random access memories (RAMs), permanent storages, and various storages in other forms according to characteristics of the chunks, and configure storages according to the size and the frequency of use of the chunks. The storage 130 or 230 includes magnetic media such as a hard disk, a floppy disk, and a magnetic tape; optical media such as a compact disk read-only memory (CD-ROM) and a digital video disk (DVD); magneto-optical media such as a floptical disk, a ROM, a RAM, and a flash memory.

Figure 6:
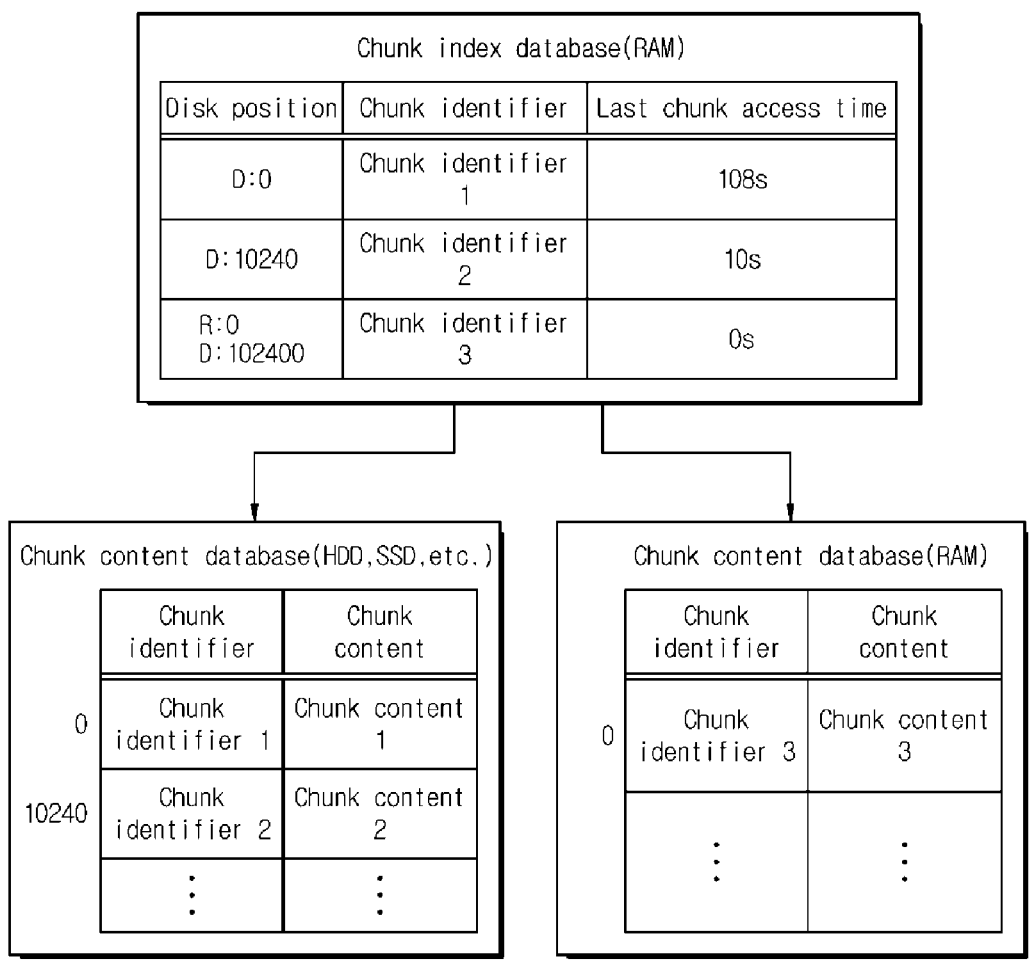
FIG. 6 is a block diagram of an example of a database for managing chunk content in a content transmission system according to at least one embodiment of the present disclosure.

As an example, the most recently consulted chunk is assumed to have a high frequency of use and will be stored in a RAM from which the chunk is rapidly read, whereas chunks predicted to have low frequencies of use are stored in a secondary disk. Therefore, referring to an example of a database for managing chunks as shown in FIG. 6, a chunk content database (a disk (a hard disk drive (HDD)), a solid state disk (SDD), etc.) manages chunk identifiers and chunk content, and a RAM that is rapidly consulted is applied to a chunk index database to record positions on the disk at which chunk identifiers and the corresponding chunks are recorded. Also, the most popular content is additionally stored not in the disk but in the chunk content database (RAM) such that rapid service is provided.

A database of the storage 130 or 230 employs data structures, such as HashTable and BloomFilter, and to manage identification information on a large number of chunks, employs various structures that have already been known or will be developed in the future according to False Positive sensitivity, etc.

In at least one embodiment of the present disclosure described above, the local caching device 200 performs a duplication check on for some of content packets transmitted to the client device 20, but in at least another embodiment of the present disclosure, the central control device 100 performs a duplication check on received content packets. Configurations of a central control device and a local caching device in a content transmission system according to the at least another embodiment of the present disclosure will be described with reference to the accompanying drawings.

Figure 4:
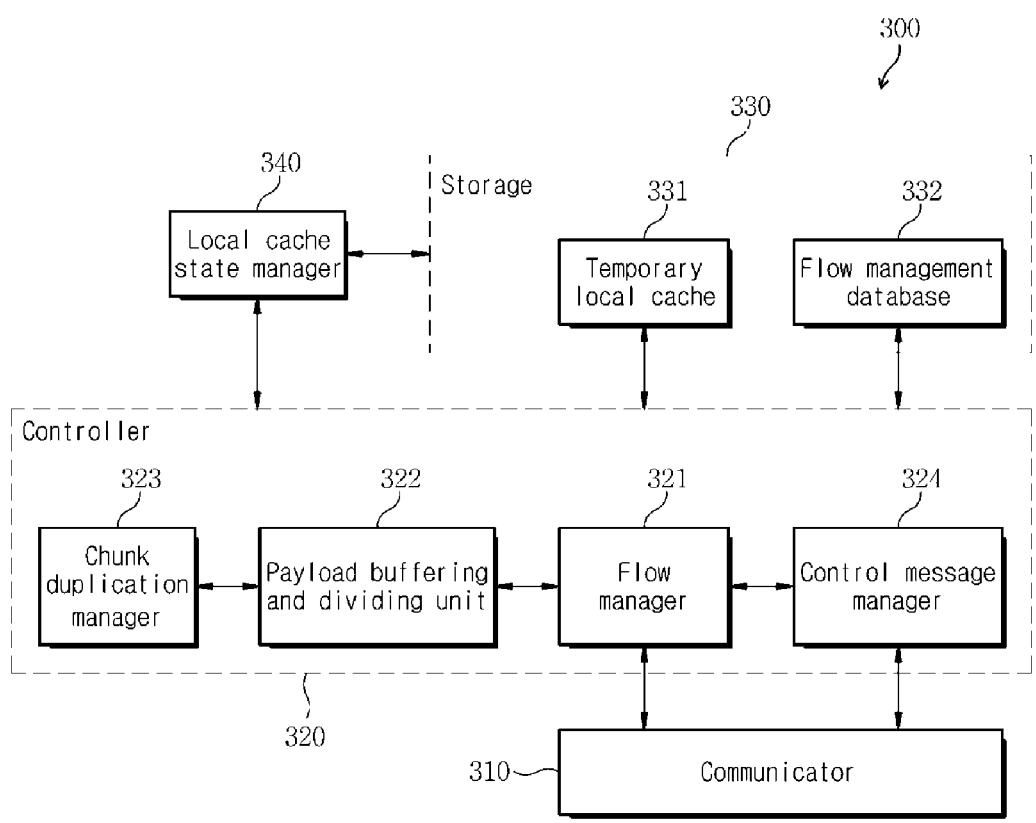
FIG. 4 is a block diagram of a configuration of a central control device in a content transmission system according to at least another embodiment of the present disclosure.

FIG. 4 is a block diagram of a configuration of a central control device in a content transmission system according to at least another embodiment of the present disclosure.

Referring to FIG. 4, the central control device 300 includes: a communicator 310, a controller 320, a storage 330 including a temporary local cache 331 and a flow management database 332, and a local cache state manager 340. All or some components of the central control device 300, such as the communicator 310, the controller 320, and the local cache state manager 340 are implemented by one or more processors and/or application-specific integrated circuits (ASICs). When transmitting content packets received from the content server 10 to the local caching device 400, the central control device 300 checks the content packets through duplication monitoring, thereby checking whether or not chunks are duplicates.

Detailed descriptions of the communicator 310, the storage 330, and the local cache state manager 340 of the central control device 300 are respectively the same as those of the communicator 110, the storage 130, and the local cache state manager 140 of the central control device 100 according to at least one embodiment of the present disclosure, and thus will be omitted for convenience.

Here, the controller 320 includes a flow manager 321, a payload buffering and dividing unit 322, a chunk duplication manager 323, and a control message manager 324.

When transmitting content packets received from the content server 10 via the communicator 310 to the local caching device 400, the controller 320 checks some of the content packets, thereby determining whether or not the content packets are duplicates. At this time, the content packets are identified in flow units, and whether or not the content packets are duplicates is determined by checking buffered flows. When the content packets are not duplication-removal target flows, the controller 320 stores chunks obtained by dividing a payload of the buffered flows and transmits the content packets to the local caching device 400 as they are. On the other hand, when the content packets are duplication-removal target flows, the controller 320 does not transmit the duplicate content packets, but transmits chunk identifiers and flow information (context of the flow) of the duplicate content packets to the local caching device 400. Subsequently, when content packets of the same content are continuously received, the controller 320 buffers a payload of a flow of the received content packets, divides the buffered payload into chunk units, temporarily stores the divided chunks together with corresponding chunk identifiers, and does not transmit the duplicate content packets but transmits only the chunk identifiers and flow information to the local caching device 400.

The flow manager 321 and the payload buffering and dividing unit 322 are the same as the flow manager 121 and the payload buffering and dividing unit 122 of the central control device 100 according to at least one embodiment of the present disclosure, and thus the descriptions thereof will be omitted for convenience. However, since the central control device 300 performs a chunk duplication check, the flow manager 321 performs flow management according to the chunk duplication check, and the payload buffering and dividing unit 322 generates chunk identifiers for the divided chunks and delivers the generated chunk identifiers to the flow manager 321.

The chunk duplication manager 323 manages whether the chunks that are currently received and will be transmitted to the client device 20 are stored in the temporary local cache 331. Using the chunk identifiers for the divided chunks received from the flow manager 321, the chunk duplication manager 323 checks whether the divided chunks have already been stored, and when there is a previously stored duplicate chunk, transmits information on the duplicate chunk to the flow manager 321. Also, when a chunk of the same content packet continuously received from the flow manager 321 is delivered, the chunk duplication manager 323 checks whether a chunk identifier for the chunk is stored in the temporary local cache 331, and transmits the check result indicating whether a coincident chunk identifier is stored to the flow manager 221.

The control message manager 324 manages information necessary to monitor duplication of content packets, manages control messages exchanged with the local caching device 400, and causes the local caching device 400 to check whether or not chunk identifiers coincide by transmitting a chunk identifier to the local caching device 400. Specifically, the control message manager 324 includes chunk identifiers and flow information (flow context) of duplicate content packets received from the flow manager 321 in a control message, and transmits the control message to the local caching device 400 via the communicator 310. Also, the control message manager 324 receives a content request message including result information on a check of a coincidence of chunk identifiers (there is no coincident chunk identifier) and content packet request information from the local caching device 400, and delivers the result information and the content packet request information to the flow manager 321.

Figure 5:
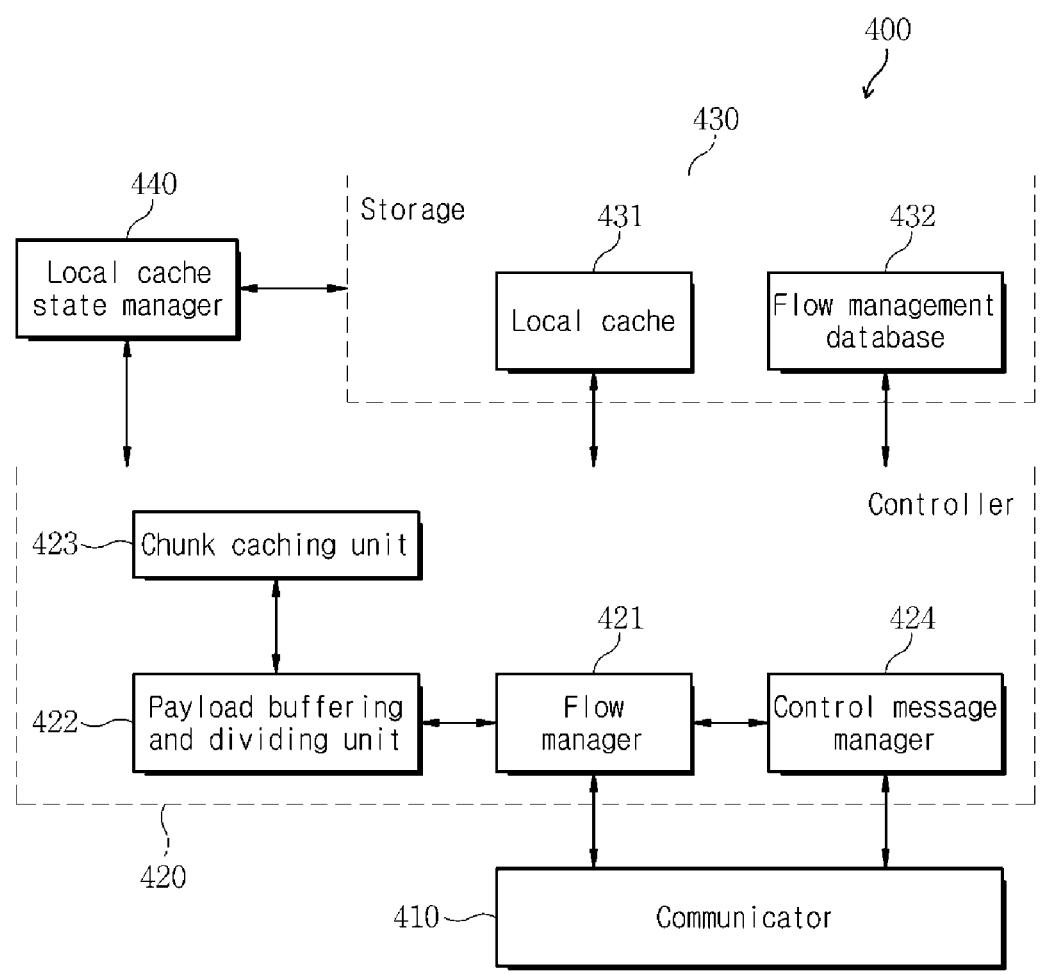
FIG. 5 is a block diagram of a configuration of a local caching device in a content transmission system according to at least another embodiment of the present disclosure.

Next, FIG. 5 is a block diagram of a configuration of a local caching device in the content transmission system according to at least another embodiment of the present disclosure.

Referring to FIG. 5, the local caching device 400 according to at least another embodiment of the present disclosure includes a communicator 410, a controller 420, a storage 430 including a local cache 431 and a flow management database 432, and a local cache state manager 440. All or some components of the local caching device 400, such as the communicator 410, the controller 420, and the local cache state manager 440 are implemented by one or more processors and/or application-specific integrated circuits (ASICs).

The local caching device 400 transmits content packets received from the central control device 300 to the client device 20, and delivers the corresponding content packets stored therein to the client using chunk identifiers transmitted according to a duplication check at the central control device 300.

Detailed descriptions of the communicator 410, the storage 430, and the local cache state manager 440 of the local caching device 400 are the same as those of the communicator 210, the storage 230, and the local cache state manager 240 of the central control device 200 according to at least one embodiment of the present disclosure, and thus will be omitted for convenience.

Here, the controller 420 includes a flow manager 421, a payload buffering and dividing unit 422, a chunk caching unit 423, and a control message manager 424.

The controller 420 transmits content packets received from the central control device 300 via the communicator 410 to the client device 20. When a chunk identifier and flow information (flow context) according to a duplication check are received from the central control device 300, the controller 420 registers the received flow information in the storage 430. When a chunk identifier coincident with the chunk identifier received from the central control device 300 has been stored, the controller 420 transmits a content packet stored in the local cache 431 of the storage 430 and corresponding to the chunk identifier to the client device 20.

The payload buffering and dividing unit 422, the chunk caching unit 423, and the control message manager 424 are the same as the payload buffering and dividing unit 222, the chunk caching unit 223, and the control message manager 225 according to at least one embodiment of the present disclosure, and thus the detailed descriptions thereof will be omitted.

Here, the flow manager 421 identifies the content packets received from the central control device 300 via the communicator 410 in flow units, buffers payloads of the identified flows, divides the buffered flows into chunk units, stores the divided chunks in the local cache 431 together with corresponding chunk identifiers, and delivers a received content packet or a content packet corresponding to a stored chunk identifier to the client device 20 via the communicator 410.

In addition, when a chunk identifier and flow information checked as duplicates by the central control device 300 are received, the flow manager 421 registers the received chunk identifier and flow information in the storage 430, delivers the received chunk identifier to the chunk caching unit 423, and delivers a content packet corresponding to a chunk checked by the chunk caching unit 423 to the communicator 410 so as to transmit the content packet to the client. The control message manager 424 receives a control message including a chunk identifier and flow information from the central control device 300, delivers the chunk identifier and flow information to the flow manager 421, receives a control message including the chunk identifier and flow information of the same continuously received packet from the central control device 300, and delivers the chunk identifier to the flow manager 421. Also, the control message manager 424 receives result information obtained by checking whether a chunk identifier coincident with the received chunk identifier has been stored in the local cache 431 (there is no coincident result information) from the flow manager 421, and transmits a content request information including the result information and content packet request information to the central control device 300.

A method of optimizing network traffic in the content transmission system configured as described above will be described in detail with reference to the accompanying drawings.

First, a protocol for optimizing duplicate network transmission traffic between the central control device 100 and the local caching device 200 according to at least one embodiment of the present disclosure, that is, a message transmitting and receiving procedure, will be described.

Figure 7:
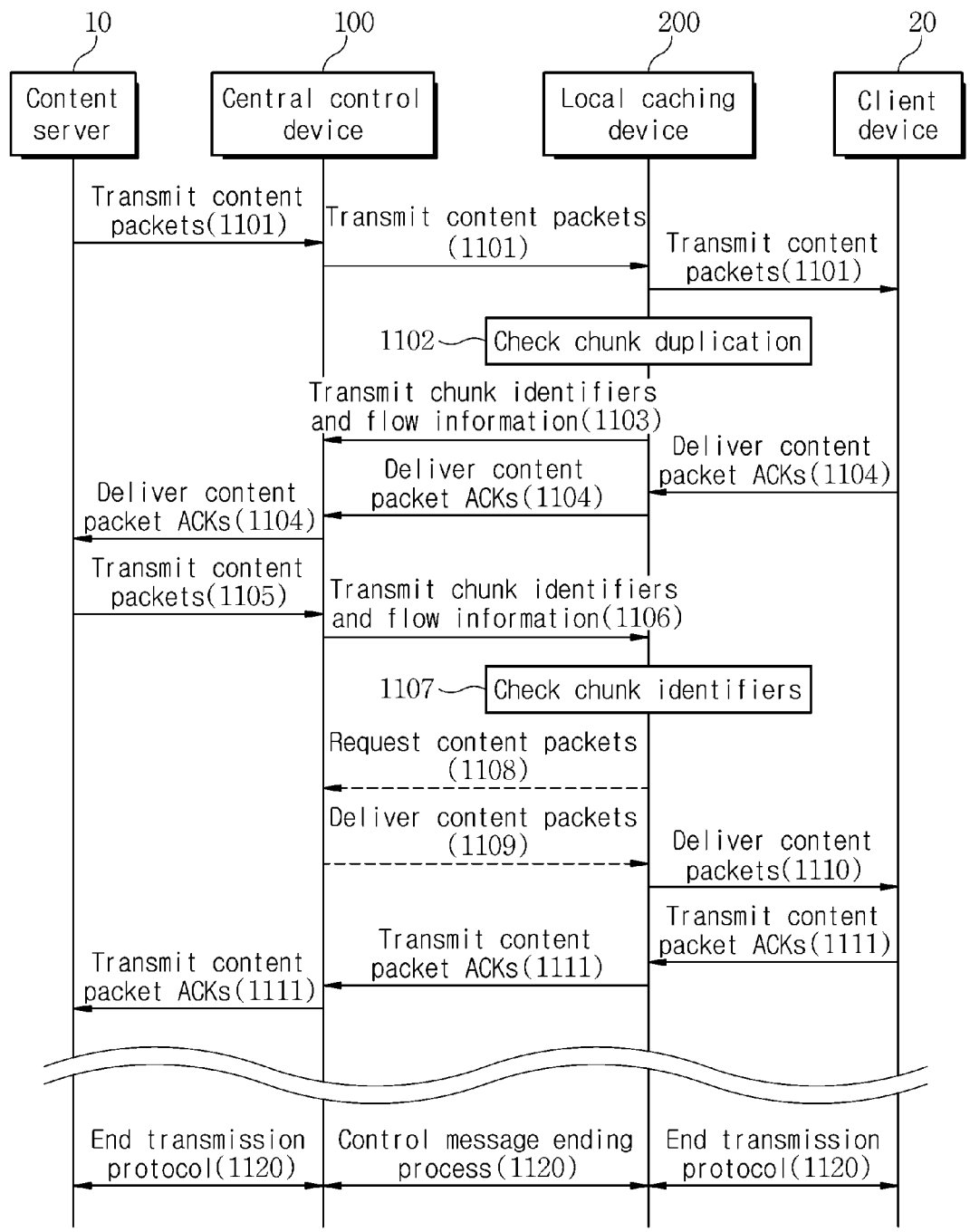
FIG. 7 is a flowchart of a method of optimizing network traffic by monitoring duplicate transmissions of content in a content transmission system according to at least one embodiment of the present disclosure.

FIG. 7 is a flowchart of a method of optimizing duplicate network transmission traffic in a content transmission system according to at least one embodiment of the present disclosure.

Referring to FIG. 7, in step 1101, when content packets are received from the content server 10, the central control device 100 transmits the received content packets to the local caching device 200. Then, the local caching device 200 delivers the content packets to the client device 20. Here, the content packets transmitted from the content server 10 are content packets transmitted from the content server 10 to the client device 20. The central control device 100 and the local caching device 200 receive and deliver the content packets to the client device 20. At this time, the central control device 100 and the local caching device 200 receives the content packets transmitted from the content server 10 to the client device 20 in the mirroring scheme.

During this operation, in step 1102, the local caching device 200 performs a chunk duplication check for the transmitted content packets. At this time, the transmitted content packets are identified in flow units, payloads of the identified flows are buffered and divided into chunks, and chunk identifiers are generated. Therefore, by using the generated chunk identifiers, the local caching device 200 checks whether or not the transmitted content packets are duplicates in chunk units.

For example, the local caching device 200 checks whether or not the content is a duplicate by comparing some of the received content packets among content packets transmitted to the client device 20 with stored content packets, and performs a duplication removal process according to whether or not the content is a duplicate. In other words, when performing the chunk duplication check in step 1102, the local caching device 200 checks initial n bytes of each flow to determine the "start" of a duplication removal process for the flow. When a content packet corresponding to the initial n bytes is present in the local caching device 200, the local caching device 200 determines that data received thereafter is highly likely to be subjected to duplication removal, and starts a duplication removal process. At this time, the generation of a signature (hash value) for the duplication check in the central control device 100 causes a high central processing unit (CPU) load. In the case of data that is determined to be not a duplicate or has a small content size, performance is highly likely to deteriorate due to load caused by signature generation rather than the effects of duplication removal. Therefore, in step 1102, the local caching device 200 receives data (content) of initial n bytes (e.g., about 1K to about 32K) from the central control device 100, and performs a duplication removal process only when the initial n bytes of a flow are present therein. On the other hand, when the initial n bytes are not present therein, the local caching device 200 delivers a content packet continuously received from the central control device 100 to the client device 20 as it is.

When a duplicate chunk is checked among the received content packets, in step 1103, the local caching device 200 transmits a control message including chunk identifiers and flow information (context of a flow) of the corresponding content to the central control device 100. Then, the central control device 100 registers the chunk identifiers and flow information (the context of the flow) included in the received control message in the flow management database 132. Here, the context of the flow includes, for example, a source IP, a destination IP, a source port, a destination port, a protocol, a payload length, a sequence number, a content type, etc. as flow identification information. When there is no duplicate chunk for the content packets, the content packets are newly transmitted content packets, and thus the local caching device 200 stores the divided chunks of the transmitted content packets in the local cache 231 together with corresponding chunk identifiers.

In step 1104, when a response message to the transmitted content packets is received from the client device 20, the local caching device 200 delivers the response message to the central control device 100 as it is. Then, in step 1104, the central control device 100 delivers the received response message to the content server 10 as it is.

Subsequently, in step 1105, when content packets of the same content are continuously received from the content server 10, the central control device 100 identifies the received content packets in flow units, and checks whether the flows are duplication-removal target flows using previously registered flow information. When the check result indicates that the flows of the content packets are duplication-removal target flows, the central control device 100 buffers payloads of the duplication-removal target flows, divides the buffered payloads into chunk units, and temporarily stores the divided chunks in the temporary local cache 131 together with corresponding chunk identifiers.

Figure 8:
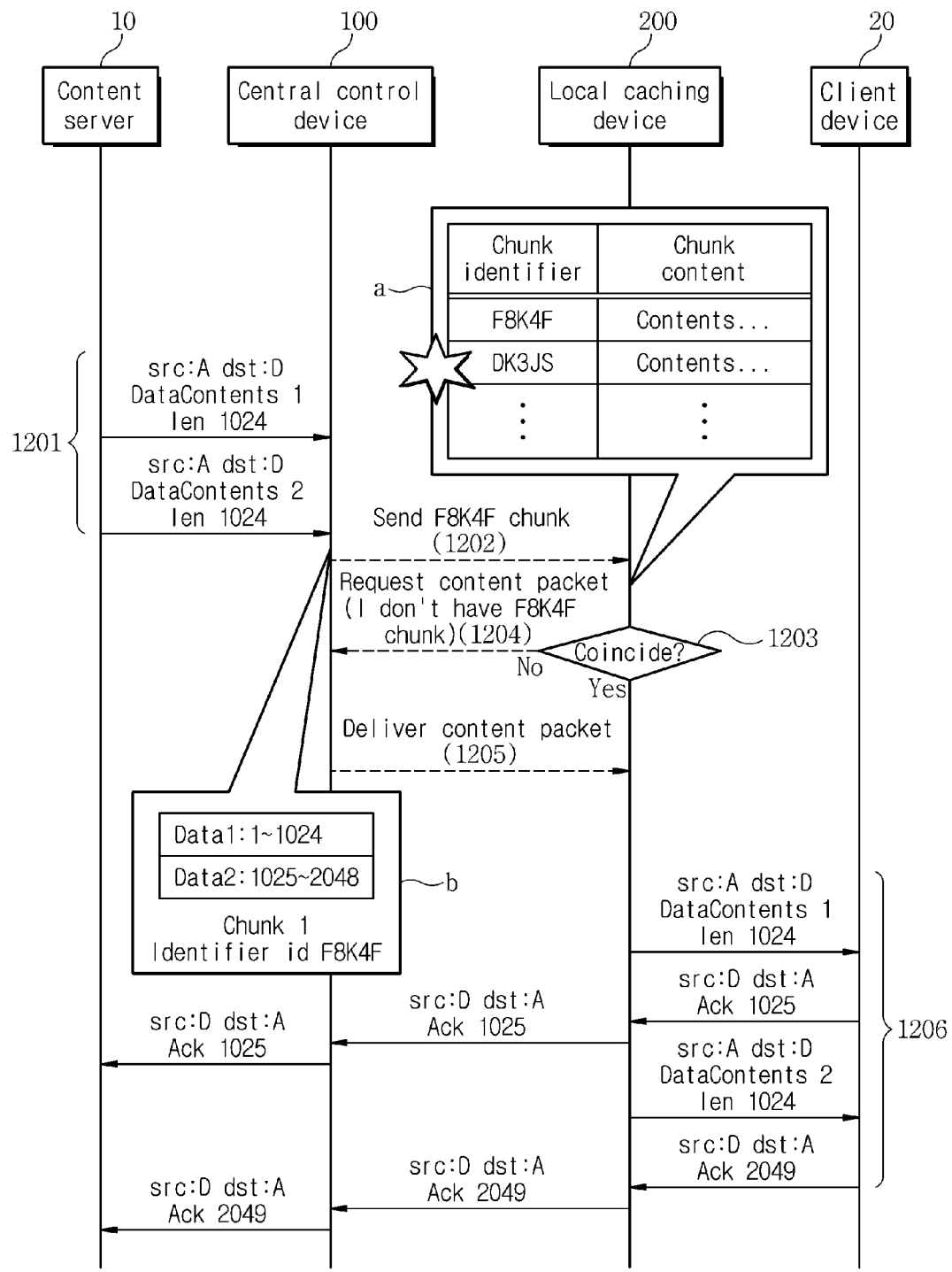
FIG. 8 is a flowchart of an example of a duplication removal process performed in a content transmission system according to at least one embodiment of the present disclosure.

Subsequently, in step 1106, the central control device 100 includes chunk identifiers of the divided chunks, for example, Chunk identifier 1 (F8K4F) as shown in FIG. 8, in a control message (send F8K4F chunk) and transmits the control message to the local caching device 200. At this time, flow information (flow context) is included in the control message and transmitted together.

In step 1107, the local caching device 200 receives the control message and checks whether the chunk identifiers included in the control message have been stored in the storage 230. When the check result indicates that chunk identifiers coincident with the received chunk identifiers have not been stored, in step 1108, the local caching device 200 transmits a content packet request message including the check result information to the central control device 100. Since the result information includes only information indicating that chunk identifiers coincident with the received chunk identifiers have not been stored, the local caching device 200 requests the corresponding content packets from the central control device 100. Then, in step 1109, the local caching device 200 receives the requested content packets from the central control device 100 in chunk units, stores the received content packets in the storage 230, and transmits the received content packets to the client device 20.

When it is checked in step 1107 that chunk identifiers coincident with the received chunk identifiers have been stored, in step 1110, the local caching device 200 reads content packets corresponding to the chunk identifiers from the storage 230 and transmits the corresponding content packets to the client device 20 using a protocol proxy.

Subsequently, in step 1111, the local caching device 200 receives a response message to the transmission of the content packets from the client device 20, and transmits the received response message to the content server 10 via the central control device 100.

When transmission of provided content is completely finished through this process, in step 1120, the central control device 100 and the local caching device 200 perform a control message ending process for the corresponding flow. Also, the central control device 100 performs a transmission protocol ending process together with the content server 10 through a protocol proxy, and the local caching device 200 performs a transmission protocol ending together with the client device 20 through the protocol proxy.

In this protocol procedure, content packets are exchanged between the content server 10 and the central control device 100 and between the client device 20 and the local caching device 200 through, for example, TCP connections.

FIG. 8 is a flowchart of an example of a TCP-based duplication removal process performed in a content transmission system according to at least one embodiment of the present disclosure.

In FIG. 8, Content server A 10 and the central control device 100 are connected through TCP, and the local caching device 200 and client D 20 are connected through TCP. Thereby, the central control device 100 and the local caching device 200 exchange duplication-removal control messages.

Referring to FIG. 8, in step 1201, the central control device 100 receives a first content packet message (src: A, dst: D, DataContents 1, len 1024) and a second content packet message (src: A, dst: D, DataContents 2, len 1024) that will be transmitted to client D 20 from Content server A 10. At this time, the central control device 100 identifies the received content packets in flow units and divides the received content packets into chunks. Then, in step 1202, the central control device 100 includes identifiers (identifier ID: F8K4F), denoted as a, of the divided chunks, for example, Chunk 1 (Data1: 1 to 1024, Data2: 1025 to 2048), in a control message together with flow information and transmits the control message to the local caching device 200.

Then, in step 1203, the local caching device 200 checks whether identifier information coincident with the identifier information (identifier ID: F8K4F) of Chunk 1 included in the received control message is stored in a database b of the local cache 231. When the check result indicates that no chunk identifier corresponding to the identifier information is stored, in step 1204, the local caching device 200 transmits a content packet request message including result information (OK, I don't have F8K4F chunk) to the central control device 100. In step 1205, the local caching device 200 receives the corresponding content packets from the central control device 100.

When it is checked in step 1203 that chunk identifiers corresponding to the identifier information have been stored, in step 1206, the local caching device 200 transmits a first content packet message (src: A, dst: D, DataContents 1, len 1024) and a second content packet message (src: A, dst: D, DataContents 2, len 1024) corresponding to the identifier information (identifier ID: F8K4F) of Chunk 1 stored in the database b to client D 20, receives a response message (src: d, dst: A, Ack 1025) and a response message (src: d, dst: A, Ack 2049) about the transmission of the content packets from client D 20, and delivers the response messages to the content server 10 via the central control device 100.

Even when the corresponding content packets are received in step 1205, the local caching device 200 transmits the received content packets to client D 20 like in step 1206.

With reference to the above-described protocol running procedure for monitoring a duplicate content transmission and the drawings, a method of optimizing duplicate network transmission traffic in each of the central control device 100 and the local caching device 200 will be described in detail.

First, a method of optimizing duplicate network transmission traffic in the central control device 100 will be described.

Figure 9:
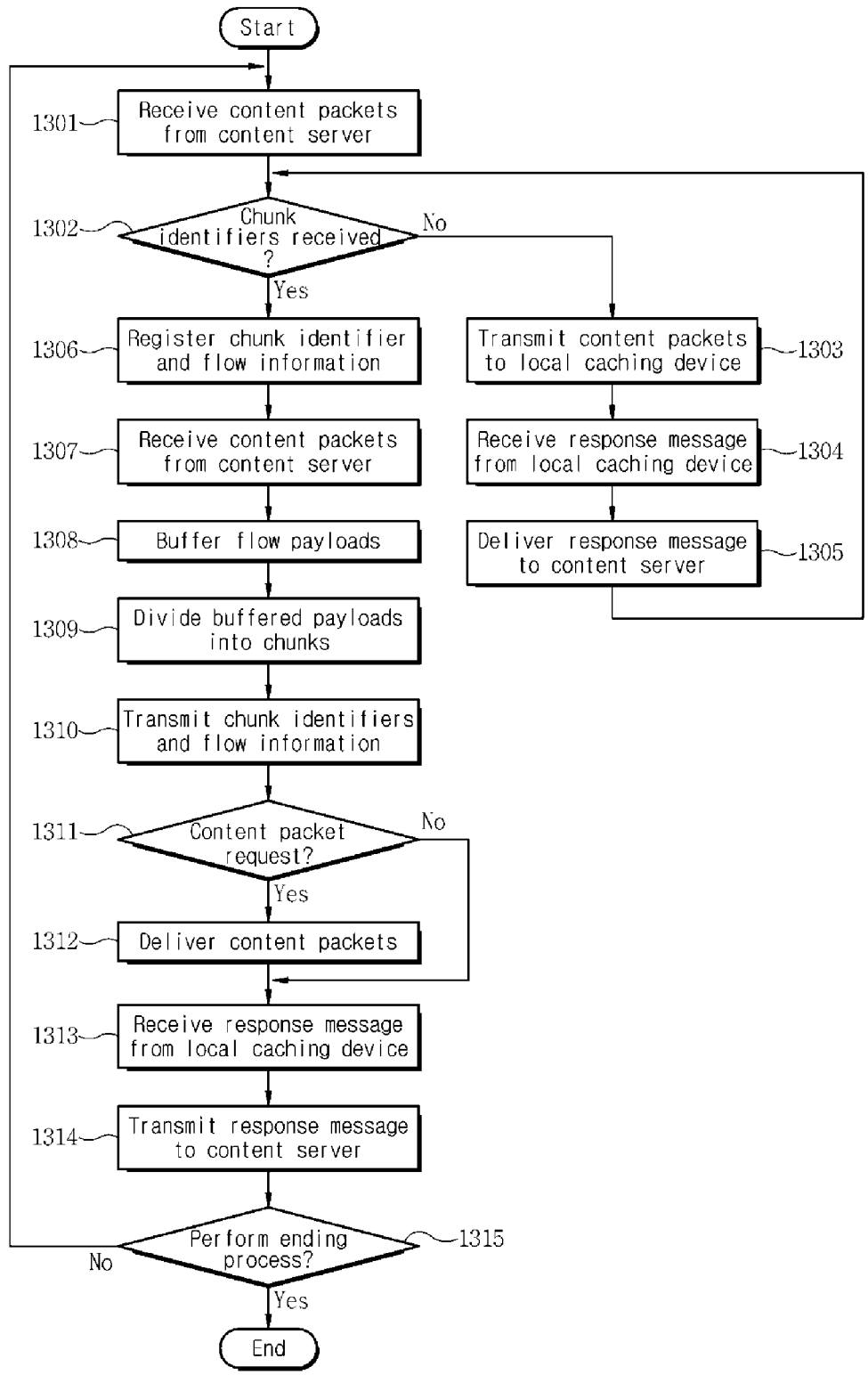
FIG. 9 is a flowchart of a method of optimizing network traffic in a central control device according to at least one embodiment of the present disclosure.

FIG. 9 is a flowchart of a method of optimizing network traffic in a central control device according to at least one embodiment of the present disclosure.

Referring to FIG. 9, in step 1301, the central control device 100 receives content packets from the content server 10. At this time, the central control device 100 identifies the received content packets in flow units, and buffers payloads of the identified flows. In step 1302, the central control device 100 checks whether chunk identifiers are received from the local caching device 200. When the check result indicates that no chunk identifier is received or there is no registered chunk identifier, in step 1303, the central control device 100 delivers the content packets of the buffered flows to the local caching device 200 as they are. Subsequently, in step 1304, the central control device 100 receives a response message from the local caching device 200, and in step 1305, delivers the received response message to the content server 10.

On the other hand, when a chunk identifier is received, in step 1306, the central control device 100 registers the received chunk identifier together with received flow information as duplication removal targets in the storage 230. At this time, the central control device 100 temporarily stores the chunks obtained by dividing the buffered payloads in the local cache 131 together with the corresponding chunk identifiers.

Subsequently, in step 1307, the central control device 100 continuously receives content packets for the same content, and as in the above-described example of FIG. 8, performs a duplication removal process for the received content packets. Specifically, in step 1308, the central control device 100 identifies the received content packets in flow units, and buffers payloads of the identified flows. In step 1309, the central control device 100 divides the buffered payloads into chunk units, and temporarily stores the divided chunks in the temporary local cache 131 together with the corresponding chunk identifiers. After that, in step 1310, the central control device 100 transmits a control message including chunk identifiers and flow information of the received content packets to the local caching device 200. Then, the local caching device 200 checks a coincidence of chunks using the chunk identifiers, and transmits a content packet request message including result information according to the check result.

Then, in step 1311, the central control device 100 checks whether a content packet request is received from the local caching device 200. When the check result indicates that there is no content packet request, the process proceeds to step 1313, and when there is a content packet request, in step 1312, the central control device 100 delivers the requested content packets to the local caching device 200.

Subsequently, in step 1313, the central control device 100 receives a response message to the transmitted content packets from the local caching device 200. In step 1314, the central control device 100 delivers the received response message to the content server 10.

In step 1315, the central control device 100 checks whether or not to perform an ending process. When the central control device 100 performs no ending process, the process reverts back to step 1301, and the central control device 100 repeats the subsequent steps. When the central control device 100 performs an ending process, the central control device 100 performs an ending protocol procedure together with the content server 10 and performs a control message ending process together with the local caching device 200.

Next, a method of optimizing duplicate network transmission traffic in the local caching device 200 will be described.

Figure 10:
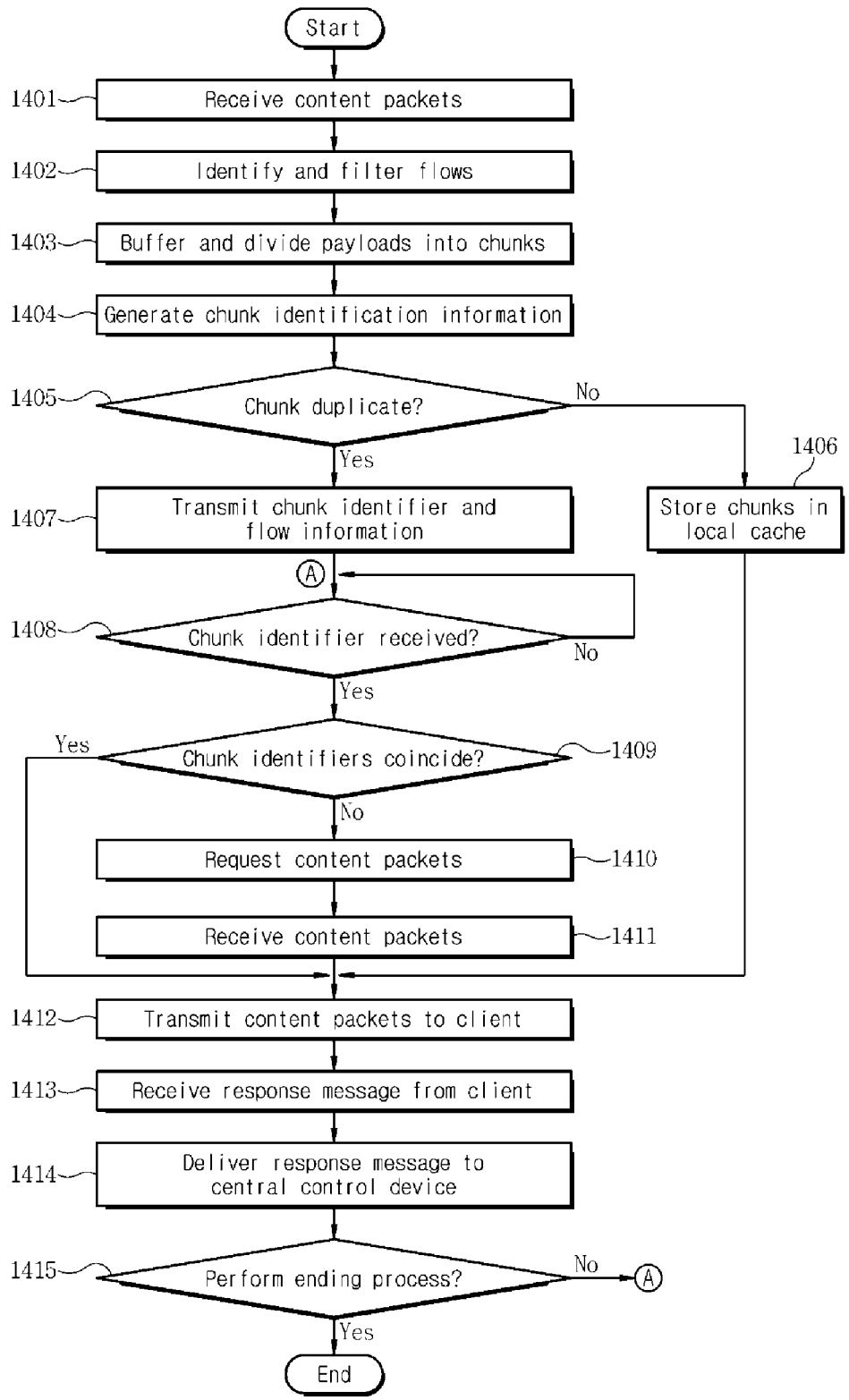
FIG. 10 is a flowchart illustrating a method of optimizing network traffic in a local caching device according to at least one embodiment of the present disclosure.

FIG. 10 is a flowchart of a method of optimizing duplicate network transmission traffic in the local caching device 200 according to at least one embodiment of the present disclosure.

Referring to FIG. 10, in step 1401, the local caching device 200 receives content packets provided by the content server 10 via the central control device 100.

Subsequently, the local caching device 200 performs a duplication removal process for monitoring content duplication.

Then, in step 1402, the local caching device 200 identifies the received content packets in flow units, and filters the identified flows. Here, filtering of the flows is performed in order to directly transmit a flow that does not require duplication removal, for example, a flow that has been encrypted or is not highly likely to be subjected to duplication removal, to the client device 20 without performing additional processing later.

In step 1403, the local caching device 200 buffers payloads of the identified flows, and divides the buffered payloads into chunk units. Then, in step 1404, the local caching device 200 generates chunk identification information.

In step 1405, the local caching device 200 checks whether or not the chunks are duplicates by comparing the generated chunk identification information with identification information on chunks stored in the local cache 231. This duplication checking process will be described with reference to FIGS. 14a to 14c.

Figure 14A:
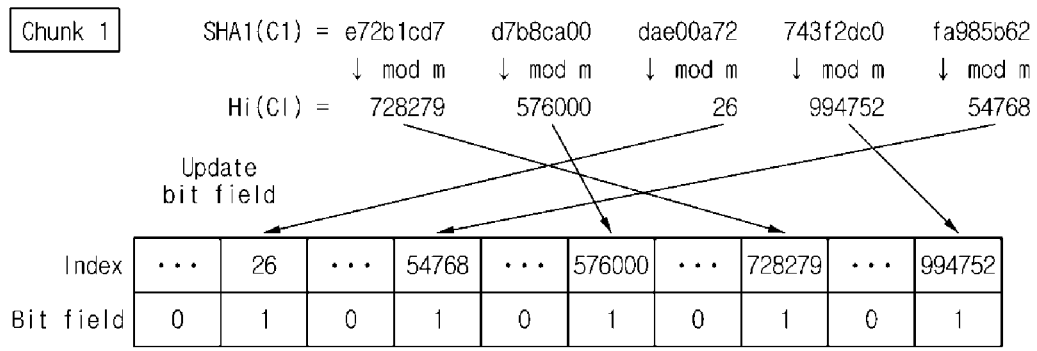
FIGS. 14a to 14c are block diagrams of examples of a chunk duplication check according to at least one embodiment of the present disclosure.
Figure 14B:
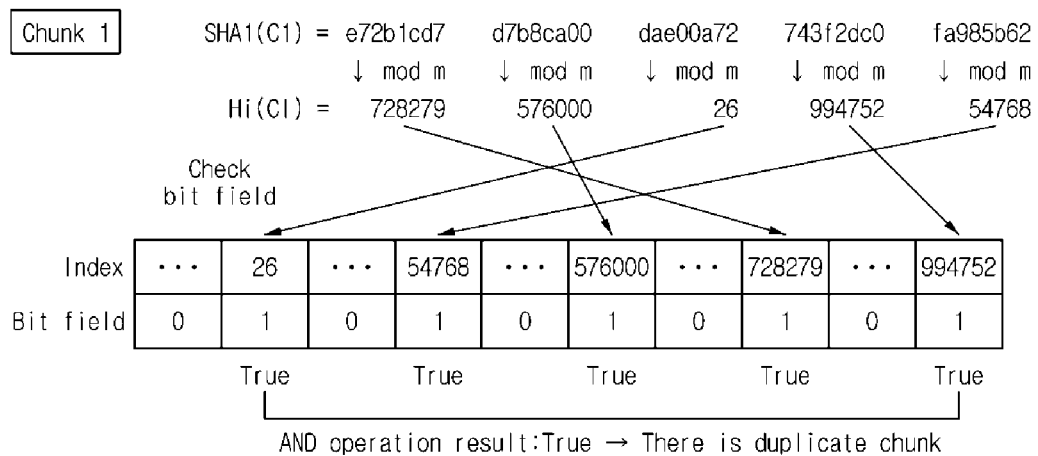

Specifically, as shown in FIG. 14a, the local caching device 200 converts Divided chunk 1 (e.g., SHA1(C1) =e72b1cd7 d7b8ca00 dae00a72 743f2dc0 fa985b62) into a hash conversion value (hi(c1)=728279 576000 26 994752

54768), and adds the converted value to index and bit fields of a chunk index database in the local cache 231.

Figure 14C:
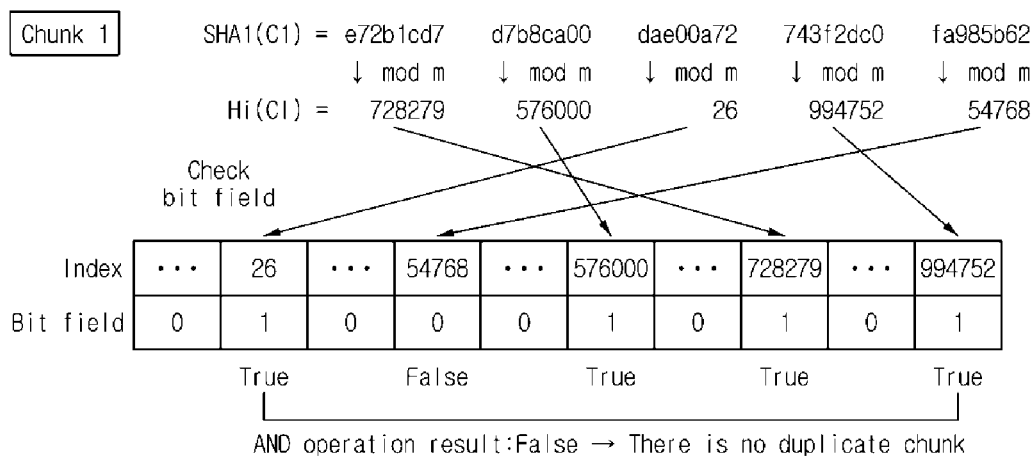

In this way, indexes that enable identification of chunks are stored in the chunk index database of the local cache 231, and it is possible to determine whether or not chunks are duplicates according to bit field values of these indexes. For example, referring to FIG. 14b, since all bit field values for the converted values of the chunks are true (1), the result of an AND operation is true, and it is determined that there is a duplicate chunk. Referring to FIG. 14c, since false (0) is included in bit field values for the converted values of the chunks, the result of an AND operation on all the bit field values is false, and it is possible to determined that there is no duplicate chunk.

Therefore, when it is checked in step 1405 that the divided chunks are not duplicates, in step 1406, the local caching device 200 stores (caches) the divided chunks in the local cache 231. Then, the process proceeds to step 1412, in which the local caching device 200 transmits the content packets to the client device 20.

Meanwhile, when it is checked in step 1405 that the divided chunks are duplicates, in step 1407, the local caching device 200 includes chunk identifiers and flow information (flow context) in a control message and transmits the control message to the central control device 100.

Subsequently, in step 1408, the local caching device 200 checks whether chunk identification information is received from the central control device 100. When chunk identification information is received, in step 1409, the local caching device 200 checks whether the received chunk identification information coincides with chunk identification information previously stored in the local cache 231. This is performed in the same way as the chunk duplication check of step 1405 according to the examples shown in FIGS. 14b and 14c.

When the check result indicates that there is no chunk identifier corresponding to the identifier information, in step 1410, the local caching device 200 transmits a content packet request message including the check result information (no coincident chunk identifier is stored) and content packet request information to the central control device 100. Then, in step 1411, the local caching device 200 receives the requested content packets from the central control device 100. On the other hand, when there are chunk identifiers corresponding to the identifier information, the process proceeds to step 1412.

Then, in step 1412, the local caching device 200 transmits content packets of chunks corresponding to the received chunk identification information to the client device 20. In step 1413, the local caching device 200 receives a response message from the client device 20. At this time, in step 1414, the local caching device 200 delivers the received response message to the content server 10 via the central control device 100.

In step 1415, the local caching device 200 checks whether or not to perform an ending process. When the local caching device 200 performs no ending process, the process reverts back to step 1408, and the local caching device 200 repeats the subsequent steps. When the local caching device 200 performs an ending process, the local caching device 200 performs an ending protocol procedure together with the client device 20 and performs a control message ending process together with the central control device 100.

Next, a protocol for optimizing network traffic between the central control device 300 and the local caching device 400 according to at least another embodiment of the present disclosure, that is, a message transmitting and receiving procedure, will be described.

Figure 11:
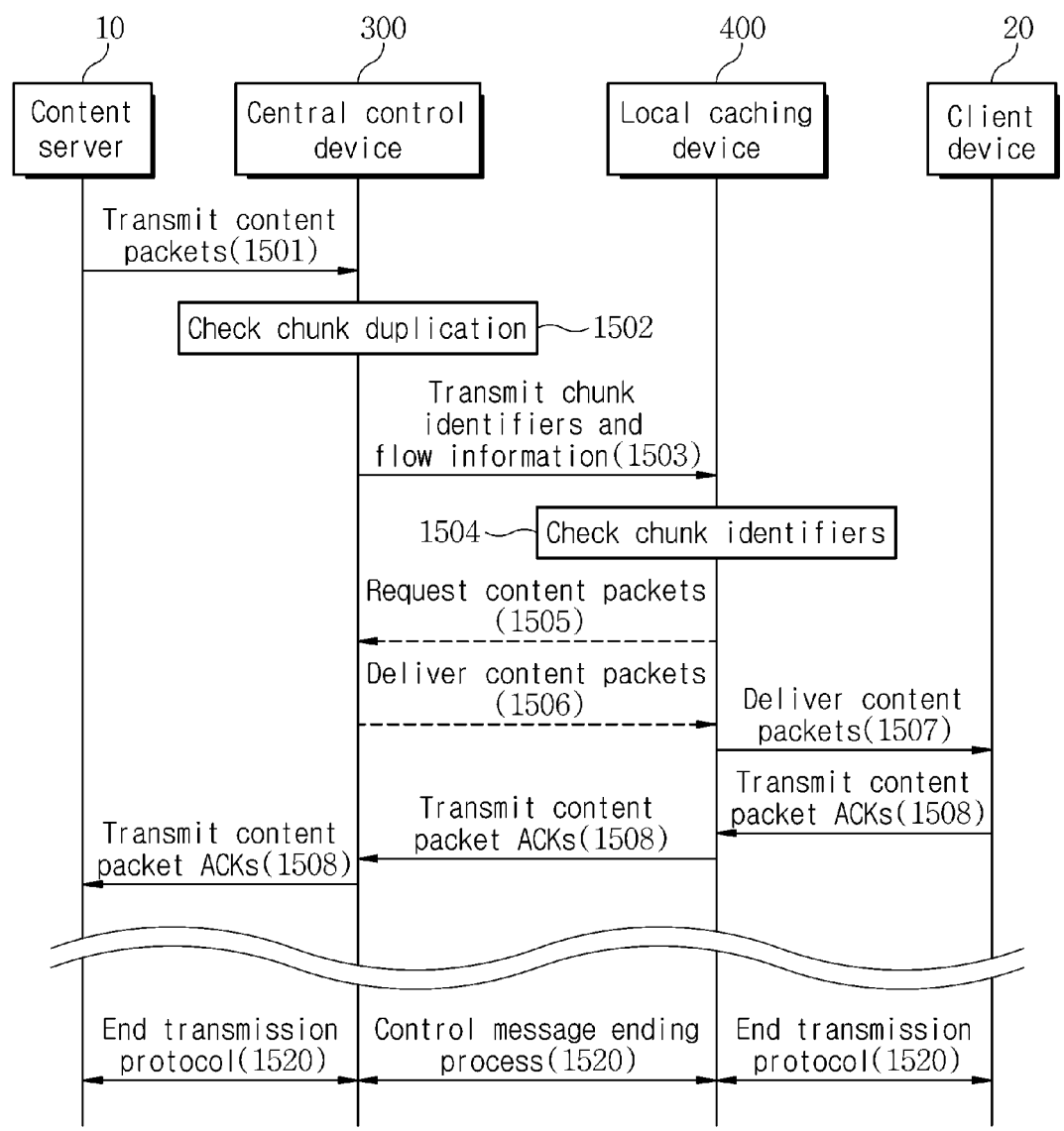
FIG. 11 is a flowchart of a method of optimizing network traffic by monitoring duplicate content transmissions in a content transmission system according to at least another embodiment of the present disclosure.

FIG. 11 is a flowchart of a method of optimizing network traffic in a content transmission system according to at least another embodiment of the present disclosure.

Referring to FIG. 11, in step 1501, the central control device 300 receives content packets from the content server 10. At this time, the central control device 300 identifies the received content packets in flow units, divides buffered payloads of the identified flows into chunks, and stores the divided chunks in the temporary local cache 331 together with corresponding chunk identifiers.

In step 1502, the central control device 300 checks whether or not chunks of the content packets are duplicates. Although not shown in FIG. 11, when the check result indicates that the content packets are not duplicates, the central control device 300 delivers the received content packets to the local caching device 400 as they are, receives a response to the transmitted content packets through the local caching device 400, and delivers the received response to the content server 10. At this time, the local caching device 400 identifies the received content packets in flow units, divides buffered payloads of the identified flows into chunks, and stores the divided chunks in the local cache 431 together with generated corresponding identifiers.

On the other hand, when it is checked in step 1502 that there is a duplicate chunk of a content packet, in step 1503, the central control device 300 includes a chunk identifier and the flow information (flow context) of the content packet checked as duplicates in a control message and delivers the control message to the local caching device 400.

Then, in step 1504, the local caching device 400 receives the chunk identifier and checks whether the received chunk identifier has been stored in a database of the local cache 431 thereof. When the check result indicates that the received chunk identifier has not been stored, in step 1505, the local caching device 400 transmits a content packet request message including content packet request information together with the result information indicating that the chunk identifier has not been stored to the central control device 300, and in step 1506, the local caching device 400 receives the requested content packet from the central control device 300. The received content packet is stored in the local cache 431 of the local caching device 400.

In the above-described process, when the chunk identifier has been stored, in step 1507, the local caching device 400 extracts the content packet corresponding to the chunk identifier from the local cache 431 and transmits the extracted content packet to the client device 20.

Subsequently, in step 1508, the local caching device 400 receives a response message upon the reception of the content packet from the client device 20, and transmits the received response message to the content server 10 via the central control device 300.

When transmission of provided content is completely finished through this process, in step 1520, the central control device 300 and the local caching device 400 perform a control message ending process for the corresponding flow. Also, the central control device 300 performs a transmission protocol ending process together with the content server 10 through a protocol proxy, and the local caching device 400 performs a transmission protocol ending process together with the client device 20 through a protocol proxy.

With reference to the above-described protocol running procedure for monitoring a duplicate content transmission and the drawings, a method of optimizing network traffic in each of the central control device 300 and the local caching device 400 will be described in detail.

Figure 12:
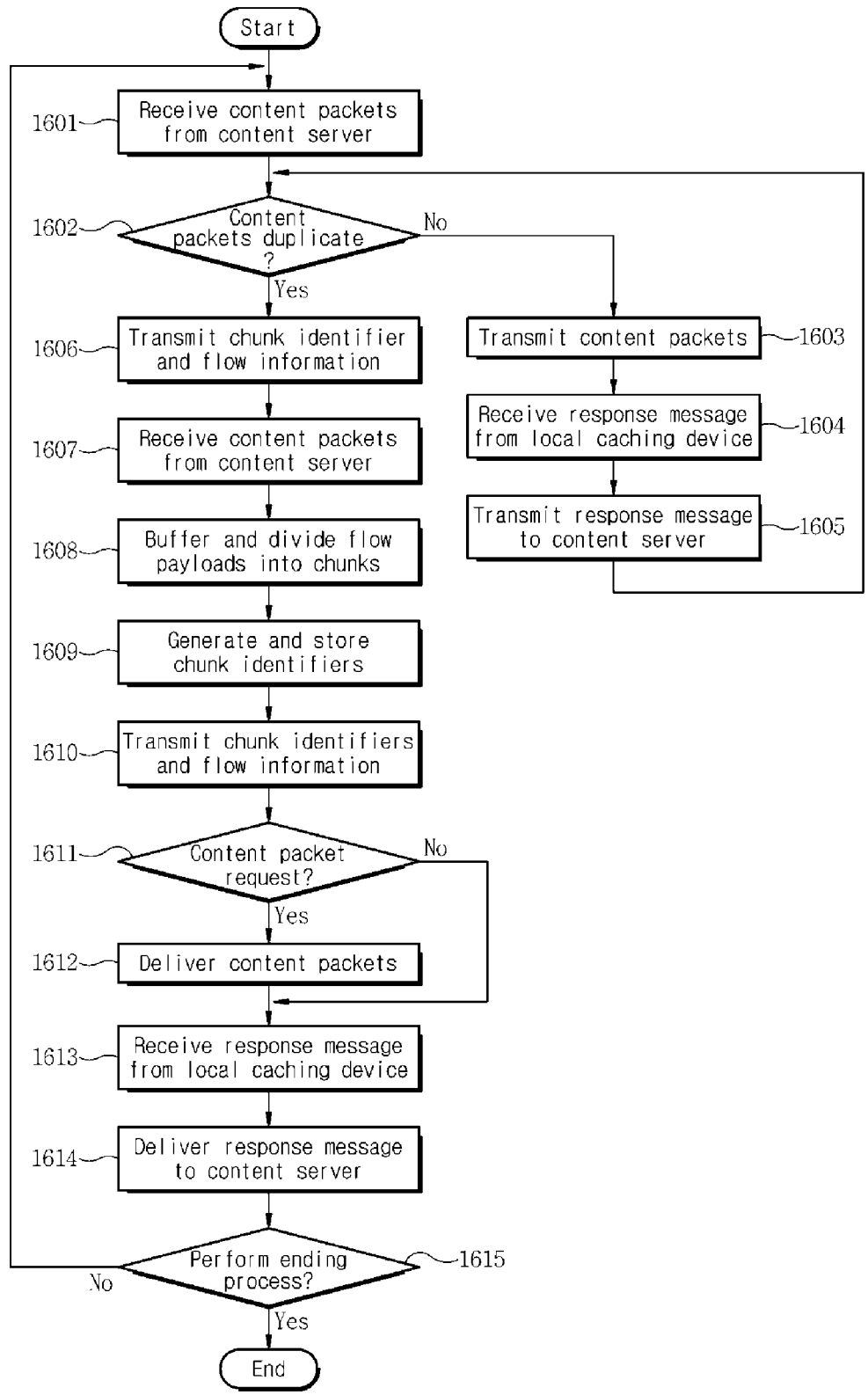
FIG. 12 is a flowchart of a method of optimizing network traffic in a central control device according to at least another embodiment of the present disclosure.

FIG. 12 is a flowchart of a method of optimizing network traffic in a central control device according to at least another embodiment of the present disclosure.

In step 1601, the central control device 300 receives content packets from the content server 10. At this time, the central control device 300 identifies the received content packets in flow units, buffers payloads of the identified flows, divides the payloads into chunk units, and stores the divided chunks in the temporary local cache 331 together with corresponding chunk identifiers.

Then, in step 1602, the central control device 300 checks whether or not the received content packets are duplicates, that is, performs a chunk duplication check.

When the check result indicates that the content packets are not duplicates, in step 1603, the central control device 300 transmits the received content packets to the local caching device 400. Then, in steps 1604 and 1605, the central control device 300 receives a response message to the transmitted content packets from the local caching device 400 and delivers the received response message to the content server 10.

On the other hand, when it is checked in step 1602 that the content packets are duplicates, in step 1606, the central control device 300 transmits chunk identifiers and flow information of the duplicate content packets to the local caching device 400.

Subsequently, when content packets of the same content are continuously received in step 1607, in step 1608, the central control device 300 identifies the received content packets in flow units, buffers payloads of the identified flows, and divides the buffered payloads into chunk units. In step 1609, the central control device 300 generates chunk identifiers for the divided chunks, and stores the divided chunks in the corresponding database of the temporary local cache 331 together with the generated corresponding chunk identifiers.

After that, in step 1610, the central control device 300 includes the chunk identifiers and flow information in a control message and transmits the control message to the local caching device 400. Subsequently, in step 1611, the central control device 300 checks whether a content packet request message including result information on a check of a coincidence of chunk identifiers (no chunk identifier has been stored) is received from the local caching device 400.

When the check result indicates that there is no content packet request, the process proceeds to step 1613. When there is a content packet request, in step 1612, the central control device 300 transmits the requested content packets to the local caching device 400.

In step 1613, the central control device 300 receives a response message about the content packets transmitted to the client device 20 from the local caching device 400, and in step 1614, delivers the received response message to the content server 10.

In step 1615, the central control device 300 checks whether or not to perform an ending process, and performs the ending process or repeats the above-described process beginning with step 1601.

Next, a method of optimizing network traffic in the local caching device 400 will be described.

Figure 13:
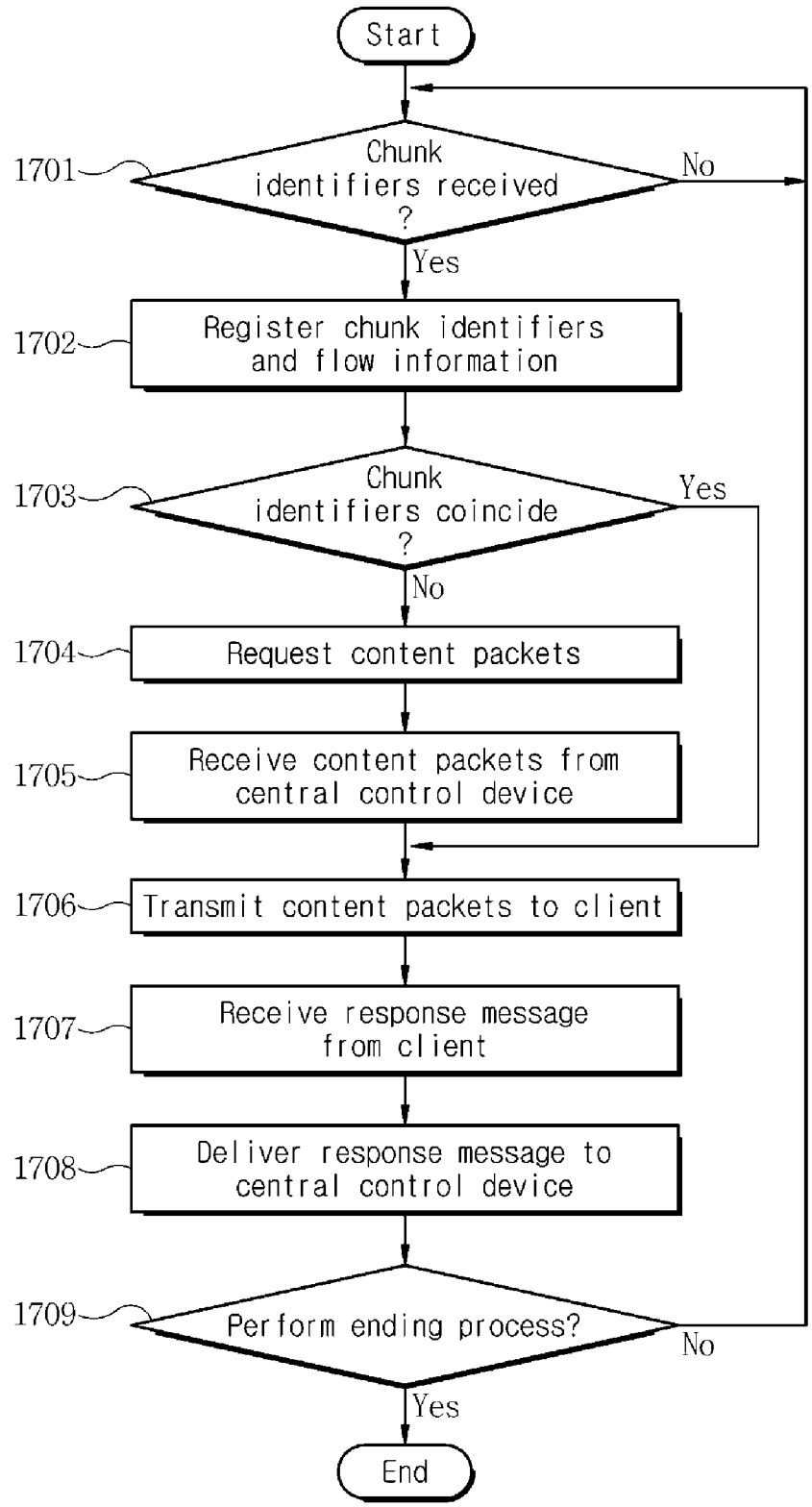
FIG. 13 is a flowchart of a method of optimizing network traffic in a local caching device according to at least another embodiment of the present disclosure.

FIG. 13 is a flowchart of a method of optimizing network traffic in a local caching device according to at least another embodiment of the present disclosure.

In the at least another embodiment of the present disclosure, content packets provided by the content server 10 are checked for duplication by the central control device 300 before being transmitted to the client device 20. At this time, content packets checked as duplicates are provided to the client device 20 through the process illustrated in FIG. 13, and content packets checked as non-duplicates are transmitted from the central control device 300 to the local caching device 400 as they are and provided to the client device 20. At this time, the central control device 300 and the local caching device 400 identify the received content packets in flow units, buffers payloads of the identified flows, divides the buffered payloads into chunks, and stores the divided chunks together with corresponding chunk identifiers.

Referring to FIG. 13, in step 1701, the local caching device 400 checks whether a chunk identifier has been received from the central control device 300. When the check result indicates that no chunk identifier has been received, the local caching device 400 keeps waiting for reception of chunk identifiers. When a control message including a chunk identifier and flow information is received, in step 1702, the local caching device 400 registers the received chunk identifier and flow information (flow context) in the storage 430.

In step 1703, the local caching device 400 checks whether the received chunk identifier coincides with a previously stored chunk identifier. In other words, the local caching device 400 checks whether the received chunk identifier has been stored. When the check result indicates that a chunk identifier coincident with the received chunk identifier has not been stored, in step 1704, the local caching device 400 requests the corresponding content packets from the central control device 300. At this time, the local caching device 400 transmits a content packet request message including the result information (no chunk identifier is stored) and the corresponding content packet request information to the central control device 300. Then, in step 1705, the local caching device 400 receives the requested content packets from the central control device 300, and in step 1706, delivers the received content packets to the client device 20. At this time, the delivered content packets are non-duplicate content packets, and divided chunks for the received content packets are stored together with corresponding identifiers.

On the other hand, when it is checked in step 1703 that a chunk identifier coincident with the received chunk identifiers has been stored, in step 1706, the local caching device 400 transmits content packets corresponding to the stored chunk identifier to the client device 20.

In step 1707, the local caching device 400 receives a response message about the transmitted content packets from the client device 20, and in step 1708, delivers the response message to the content server 10 via the central control device 300.

Subsequently, in step 1709, the local caching device 400 checks whether or not to perform an ending process. When the local caching device 400 performs an ending process, the local caching device 400 finishes a process with the central control device 300, otherwise, the process reverts back to step 1701.

A duplication removal process in the above-described methods of optimizing network traffic according to the embodiments of the present disclosure will be described in detail. Two embodiments of the duplication removal process will be separately described according to chunk dividing methods. However, in the present disclosure, the duplication removal process is also performed using various chunk dividing methods other than these embodiments.

First, a process for dividing buffered payloads into chunks of a fixed size will be described in detail with reference to FIGS. 15a and 15b. This duplication removal process is performed by both the central control device 100 and the local caching device 200. In at least one embodiment of the present disclosure, the duplication removal process performed by the local caching device 200 will be described as an example, and the same process is also performed by the central control device 100.

Figure 15A:
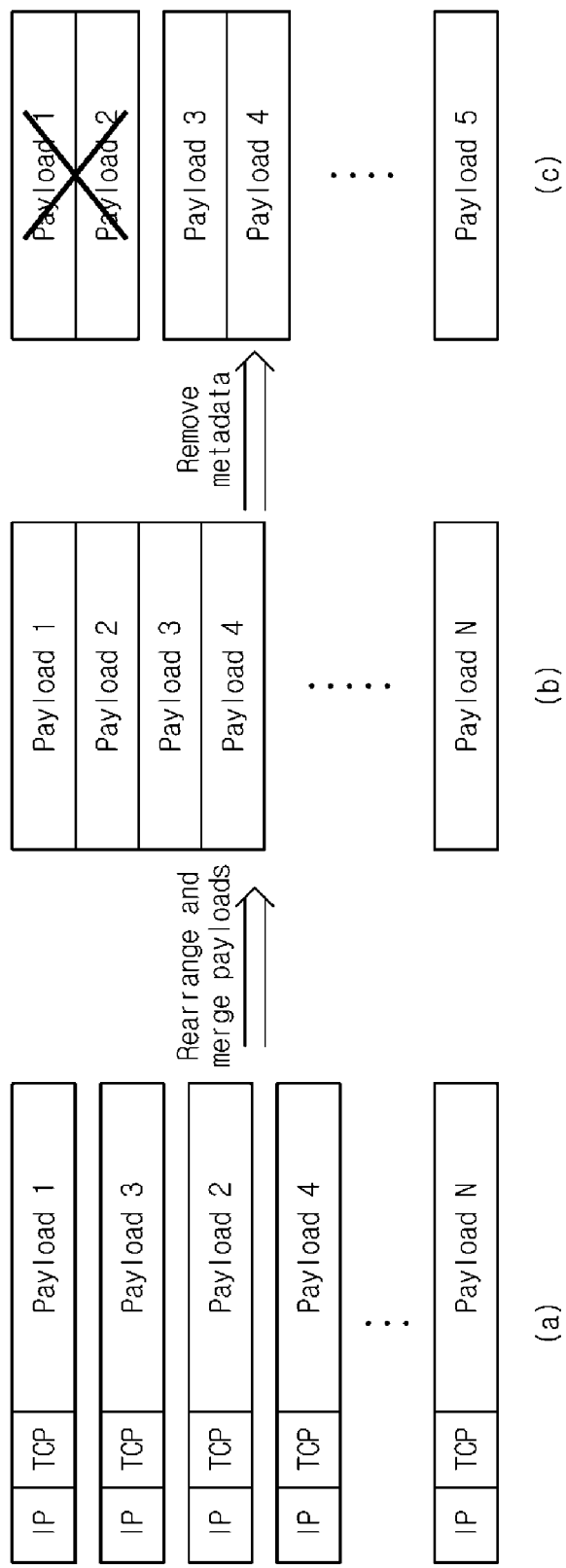
FIGS. 15a and 15b are block diagrams of an example of a process for dividing buffered payloads into chunks of a fixed size according to at least one embodiment of the present disclosure.
Figure 15B:
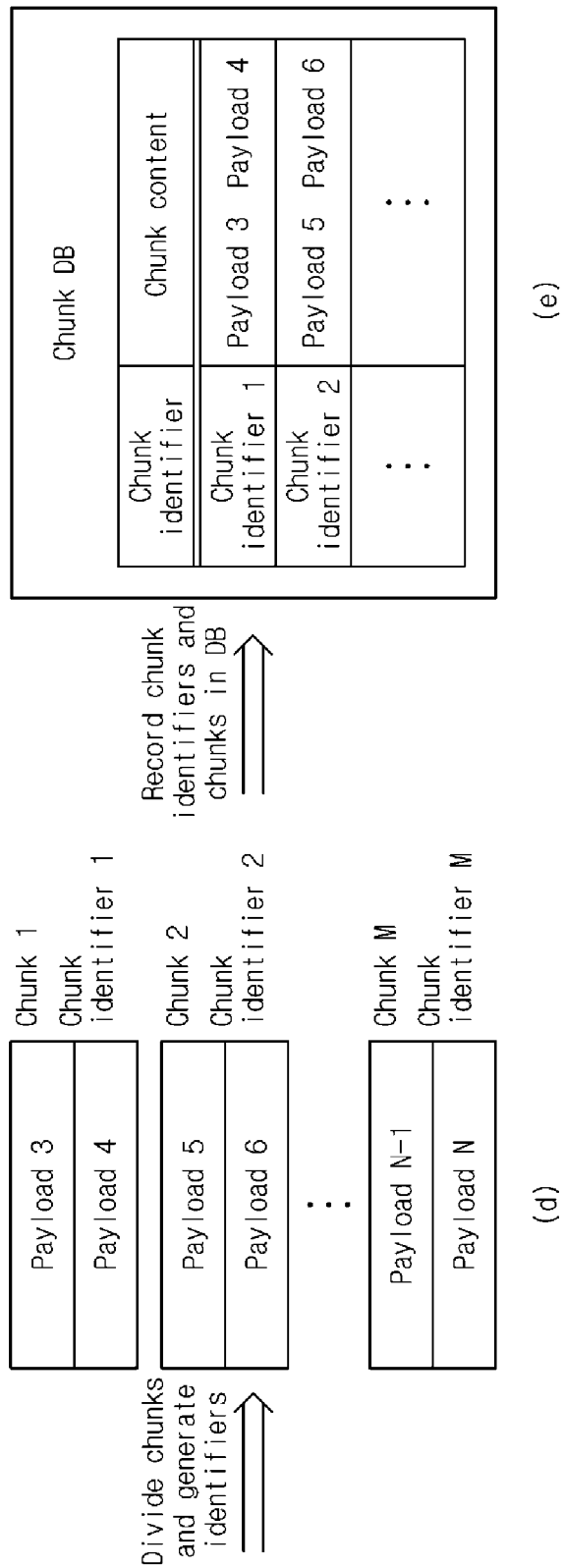

Referring to FIGS. 15a and 15b, when content packets are received, the local caching device 200 identifies the content packets in flow units. At this time, the delivered content packets are changed in sequence while being delivered, and thus the local caching device 200 buffers the flows. Specifically, the local caching device 200 rearranges payloads of the content packets as shown in (a) of FIG. 15a, and removes unnecessary IP and TCP headers and merges only pieces of content as shown in (b) of FIG. 15a. After that, the local caching device 200 removes meaningless metadata of the content or control messages to be used in an application protocol from the merged content, and leaves only meaningful pieces of content. Alternatively, these unnecessary messages are removed in a step before the merger. A type of the metadata varies according to application protocols. In the case of video content delivered through HTTP, HTTP headers in which unique data of clients are included are removed. In the case of P2P, control messages used in a P2P application are also excluded from caching targets.

When sufficient pieces of data are merged and buffered in this way, the local caching device 200 divides the buffered content again into meaningful chunks as shown in (d) of FIG. 15b, and stores each of the chunks in a database together with its unique identifier as shown in (e) of FIG. 15b. Here, to obtain a unique identifier, a known hash function, such as MD5 or SHA1, is used on payloads of a chunk. Only identification information (a unique identifier) of a chunk enables identification of the content of the chunk, and is designated as having a short length, which does not require much cost for comparison such that whether or not there is a coincident chunk is checked without comparing the entire content of the chunk. A known hash function, for example, MD5 or SHA1, is used.

In addition to at least one embodiment, a method of dividing content into chunk units is determined according to a chunk method, a chunk size, or characteristics of the content. It is possible to use various methods, for example, a method of dividing content into meaningful content units according to characteristics of the content, Rabin's fingerprinting known as a method of meaningfully finding a duplication by grasping the content, or other methods.

Figure 16A:
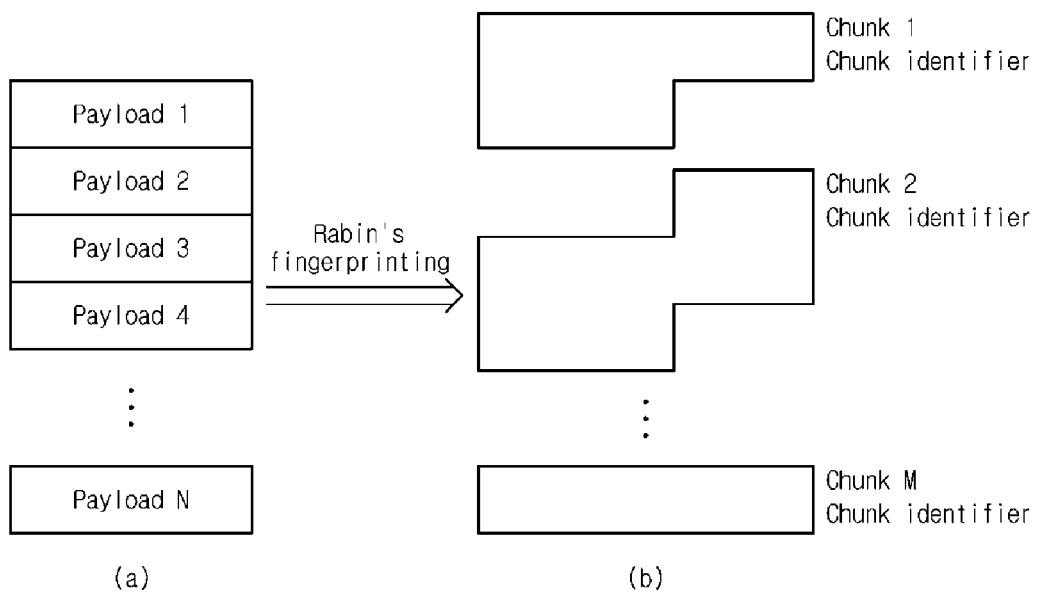
FIGS. 16a and 16b are block diagrams of an example of a process for dividing buffered payloads into chunks of variable sizes according to at least one embodiment of the present disclosure.
Figure 16B:
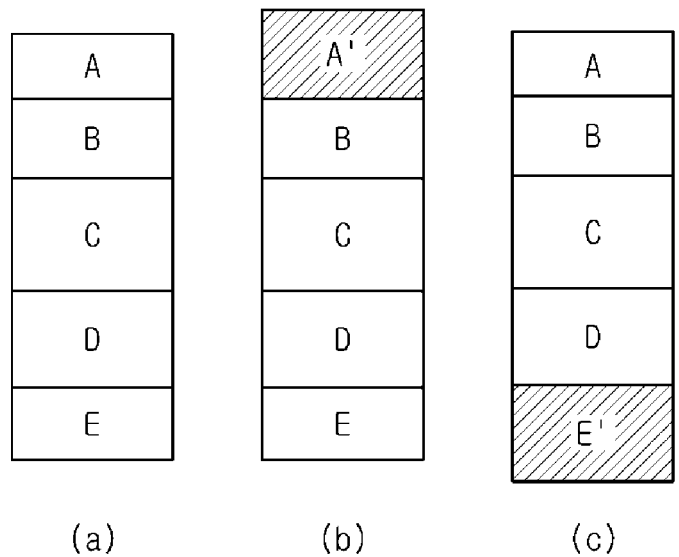

For example, in at least another embodiment, content is divided into chunks of variable sizes by grasping the content using a Rabin's fingerprinting function as shown in FIGS. 16a and 16b. Here, FIG. 16b is an example of chunking using Rabin's fingerprinting in which (a) shows original data, (b) shows a case where an insertion occurs at the front end of the data, and (c) a case where an insertion occurs at the rear end of the data.

A method of optimizing network traffic according to the present disclosure is implemented in the form of software readable by various computing means and recorded in a non-transitory computer-readable recording medium. Here, the non-transitory recording medium separately includes program instructions (or program commands), data files, data structures, etc. or include a combination thereof. The program instructions recorded in the non-transitory recording medium are program instructions that are specially designed and configured for the present disclosure or that are well known to and are used by those of ordinary skill in the art. Examples of the non-transitory recording medium include magnetic media, such as a hard disk, a floppy disk, and a magnetic tape, optical media, such as a CD-ROM and a DVD; magneto-optical media, such as a floptical disk, and hardware devices that are specially configured to store and execute program instructions, such as a ROM, a RAM, and a flash memory. The examples of the program instructions include not only machine language code generated by a compiler, but also high-level language code that is executed by a computer using an interpreter, and so on. The above-described hardware devices are configured to operate as one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The present disclosure relates to a traffic optimizing method, a central control device, and a local caching device for reducing traffic on a network caused by duplicate content transmissions in a content transmission system. By preparing the central control device connected to a content server and the local caching device connected to a client on a content transmission network to monitor duplicate content transmission, the present disclosure is simply and transparently applied to an existing system and protocol, thus providing a practical and operationally feasible content transmission system.

In addition, according to various embodiments of the present disclosure, the central control device monitors duplicate transmissions of content packets provided by the content server to the client, and checks whether or not there is coincident content by exchanging only identification information with the local caching device without transmitting duplicate content packets, thereby reducing the load of network traffic transmitted in a duplicate manner in a specific section of the network (e.g., between the Internet and a concentrator station). For this reason, it is possible to ensure convenience in network management, and to decrease costs. Furthermore, the local caching device reduces duplicate transmissions of content by checking content duplication, thus improving the quality perceived by the client.

While preferable exemplary embodiments of the present disclosure are shown and described above, it should be understood by those of skilled in the art that the present disclosure is not limited thereto and various modifications or changes to the described embodiments are made without departing from the spirit and scope of the claimed invention as defined by the appended claims. Specific terms used in this disclosure and drawings are used for illustrative purposes and not to be considered as limitations of the present disclosure. Exemplary embodiments of the present disclosure have been described for the sake of brevity and clarity. It should be considered that the disclosure is to cover all modifications, changes, and equivalents falling within the spirit and scope of the claimed invention.

What is claimed is:

1. A central control device, comprising:
a communicator, implemented by one or more processors, configured to perform communication with a content server and a local caching device to minimize duplicate transmissions of a content packet to be transmitted from the content server to a client device by using a chunk identifier and flow information of a duplicate chunk of a content packet;

a controller, implemented by one or more processors, configured to:

receive the content packet to be provided to the client device from a content server through the communicator, and transmit the received content packet to a local caching device, wherein the local caching device divides the received content packet into chunks, generate corresponding chunk identifiers each corresponding to the divided chunks, store the divided chunks together with the corresponding chunk identifiers, check duplication of the divided chunks by comparing the received content packets among content packets transmitted to the client device with stored content packets, and transmit the chunk identifier and the flow information of the duplicate chunk to the central control device when the duplicate chunk is checked among the received content packets;

receive the chunk identifier and flow information of the duplicate chunk of the content packet from the local caching device, and register the chunk identifier and the flow information as duplication-removal targets; and receive a next content packet from the content server, and transmit a chunk identifier and flow information of the next content packet to the local caching device, wherein the local cache device transmit the content packet corresponding to the received chunk identifier of the next content packet to the client device when the received chunk identifier of the next content packet is coincident with the stored chunk identifiers; and a storage, including a local cache state manager implemented by one or more processors, configured to temporarily store chunks divided from the received content packet together with corresponding chunk identifiers; and store the chunk identifier and the flow information received from the local caching device.

2. The central control device of claim 1, wherein the controller includes:

a flow manager, implemented by one or more processors, configured to identify the received content packet in flow units, temporarily store the divided chunks obtained by dividing payloads of identified flows, receive the chunk identifier and the flow information from the local caching device, and register the received chunk identifier and the received flow information, and prevent the duplicate chunk from being transmitted to the local caching device; and a payload buffering and dividing unit, implemented by one or more processors, configured to buffer the payloads of the identified flows, and divide the buffered payloads into the chunks.

3. The central control device of claim 2, wherein the controller further includes a chunk duplication manager configured to check duplication of the divided chunks; and cause the chunk identifier and the flow information of the duplicate chunk to be transmitted to the local caching device.

4. A local caching device, comprising:

a communicator, implemented by one or more processors, configured to communicate with a client device and a central control device connected to a content server to minimize duplicate transmissions of a content packet to be transmitted from the content server to a client device by using a chunk identifier and flow information of a duplicate chunk of a content packet;

a controller, implemented by one or more processors, configured to receive a content packet from the central control device through the communicator, divide the received content packet into chunks, generate corresponding chunk identifiers each corresponding to the divided chunks, store the divided chunks together with the corresponding chunk identifiers, check duplication of the divided chunks by comparing the received content packets among content packets transmitted to the client device with stored content packets, and transmit the chunk identifier and the flow information of the duplicate chunk to the central control device when the duplicate chunk is checked among the received content packets for registering, at the central control device, the chunk identifier and the flow information of the duplicate chunk as duplication-removal targets, and provide the received content packet to the client device; and receive the chunk identifier and the flow information of a duplicate chunk from the central control device, wherein the central control device receive a next content packet from the content server and check whether the received next content packet indicates the duplication-removal targets using the registered flow information, and control transmission of the previously stored content packet corresponding to the received chunk identifier to the client device when the received chunk identifier of the next content packet is coincident with the stored chunk identifiers; and a storage, including a local cache state manager implemented by one or more processors, configured to store the divided chunks together with the corresponding chunk identifiers.

5. The local caching device of claim 4, wherein the controller includes a flow manager, implemented by one or more processors, configured to identify the received content packet in flow units; and receive a chunk identifier for identified flows from the central control device, and control transmission of the previously stored content packet corresponding to the received chunk identifier to the client device;

a payload buffering and dividing unit, implemented by one or more processors, configured to buffer payloads of the identified flows; and divide the buffered payloads into chunks; and a chunk caching unit, implemented by one or more processors, configured to cause the storage to store the divided chunks together with the corresponding chunk identifiers.

6. The local caching device of claim 5, wherein the controller further includes a chunk duplication manager, implemented by one or more processors, configured to perform a chunk duplication check for the received content packet;

deliver the chunk identifier and the flow information of the duplicate chunk checked as duplicates to the flow manager; and check whether a chunk identifier coincident with the received chunk identifier has been stored.

7. The local caching device of claim 6, wherein the flow manager is further configured to control transmission of the chunk identifier and the flow information of the duplicate chunk to the central control device;

when no chunk identifier coincident with the received chunk identifier has been stored, request a content packet corresponding to the received chunk identifier from the central control device; and control reception of requested content packet and provision of the requested content packet to the client device.

8. A method of optimizing network traffic in a content transmission system including a central control device connected to a content server providing content packets and a local caching device connected to a client device to which the content packets are provided, the method comprising:

transmitting, at the central control device, content packets received from the content server to the local caching device;

checking, at the local caching device, chunk duplication of the received content packets by comparing the received content packets among content packets transmitted to the client device with stored content packets and providing the received content packets to the client device;

dividing the received content packet into chunks, generating corresponding chunk identifiers each corresponding to the divided chunks, storing the divided chunks together with the corresponding chunk identifiers, checking duplication of the divided chunks by comparing the received content packets among content packets transmitted to the client device with stored content packets, when said checking at the local caching device finds a duplicate chunk of the received content packets, transmitting, at the local caching device, a chunk identifier and flow information of the duplicate chunk to the central control device;

registering, at the central control device, the received chunk identifier and the received flow information of the duplicate chunk as duplication-removal targets;

when a next content packet is received from the content server, transmitting, at the central control device, a chunk identifier and flow information of the next content packet for a flow registered as a duplication-removal target to the local caching device in case the received next content packet is checked to indicate the duplication-removal targets; and when the local caching device receives the chunk identifier and the flow information of the duplicate chunk from the central control device, transmitting, at the local caching device, a previously stored content packet corresponding to the received chunk identifier to the client device when the received chunk identifier of the next content packet coincident with the stored chunk identifiers.

9. The method of claim 8, further comprising:

when the local caching device has not stored a content packet corresponding to the received chunk identifier, requesting, at the local caching device, the content packet corresponding to the received chunk identifier from the central control device;

receiving, at the local caching device, the requested content packet from the central control device; and transmitting, at the local caching device, the received content packet to the client device.

10. The method of claim 8, further comprising:

identifying, at the central control device, the received content packets in flow units, buffering payloads of identified flows, and dividing the buffered payloads into chunks; and temporarily storing the divided chunks together with generated corresponding chunk identifiers.

11. The method of claim 8, further comprising:

identifying, at the local caching device, the content packets received from the central control device in flow units, buffering payloads of identified flows, and dividing the buffered payloads into chunks; and storing the divided chunks together with generated corresponding chunk identifiers.

* * * * *